US008391882B2

(12) United States Patent
Sampath et al.

(10) Patent No.: US 8,391,882 B2
(45) Date of Patent: Mar. 5, 2013

(54) METHOD AND SYSTEM FOR INTERFERENCE MANAGEMENT IN A SPECTRUM SHARED BY WAN AND FEMTO CELLS

(75) Inventors: Ashwin Sampath, Skillman, NJ (US); Husheng Li, Knoxville, TN (US)

(73) Assignee: QUALCOMM Incorporated, San Diego, CA (US)

( * ) Notice: Subject to any disclaimer, the term of this patent is extended or adjusted under 35 U.S.C. 154(b) by 767 days.

(21) Appl. No.: 12/256,069

(22) Filed: Oct. 22, 2008

(65) Prior Publication Data

US 2010/0099431 A1    Apr. 22, 2010

(51) Int. Cl.
*H04W 72/00* (2009.01)
(52) U.S. Cl. ......... 455/454; 455/450; 455/509; 375/260
(58) Field of Classification Search .................. 455/454
See application file for complete search history.

(56) References Cited

U.S. PATENT DOCUMENTS

| 5,475,866 | A | | 12/1995 | Ruthenberg |
|---|---|---|---|---|
| 5,822,693 | A | | 10/1998 | Harrison |
| 5,930,241 | A | * | 7/1999 | Fried ............................. 370/328 |
| 5,930,721 | A | * | 7/1999 | Fried et al. ..................... 455/466 |
| 6,018,663 | A | * | 1/2000 | Karlsson et al. ............... 455/450 |
| 6,101,176 | A | * | 8/2000 | Honkasalo et al. ........... 370/335 |
| 6,219,539 | B1 | * | 4/2001 | Basu et al. ..................... 455/417 |
| 6,400,954 | B1 | * | 6/2002 | Khan et al. ..................... 455/450 |
| 6,606,499 | B1 | * | 8/2003 | Verrier et al. ............. 455/452.1 |
| 6,721,571 | B2 | * | 4/2004 | Tran et al. ...................... 455/453 |
| 6,907,243 | B1 | * | 6/2005 | Patel ............................. 455/442 |
| 6,937,577 | B1 | * | 8/2005 | Torikka et al. ............. 370/310.1 |
| 6,970,422 | B1 | * | 11/2005 | Ho et al. ......................... 370/230 |
| 7,058,968 | B2 | * | 6/2006 | Rowland et al. ..................... 726/1 |
| 7,099,629 | B1 | * | 8/2006 | Bender ............................. 455/69 |
| 7,289,803 | B1 | * | 10/2007 | Benveniste et al. ........... 455/423 |
| 7,346,354 | B2 | * | 3/2008 | Patel ............................. 455/450 |
| 7,389,112 | B2 | * | 6/2008 | Nilsson et al. ................. 455/444 |
| 7,450,504 | B1 | * | 11/2008 | Ho et al. ....................... 370/230.1 |
| 7,505,448 | B2 | * | 3/2009 | Sheng et al. .................... 370/350 |
| 7,555,300 | B2 | * | 6/2009 | Scheinert et al. ............. 455/450 |
| 7,564,819 | B2 | * | 7/2009 | Khan ............................. 370/335 |
| 7,602,723 | B2 | * | 10/2009 | Mandato et al. .............. 370/236 |
| 7,616,610 | B2 | * | 11/2009 | Kuchibhotla et al. ......... 370/335 |
| 7,652,979 | B2 | * | 1/2010 | Arslan et al. .................. 370/208 |

(Continued)

FOREIGN PATENT DOCUMENTS

WO    WO2004008794    1/2004

OTHER PUBLICATIONS

Sahin et al., "OFDMA-Based Co-channel Femtocell", Mar. 3, 2008, U.S. Appl. No. 61/033,380, 19 pages.*

(Continued)

*Primary Examiner* — Hai Nguyen
(74) *Attorney, Agent, or Firm* — Florin C. Corie

(57) ABSTRACT

Devices and methods are provided for adapting to interference in a spectrum shared by a WAN macro cell and a femto cell. In particular, described herein are techniques for adapting to the presence of a jamming WAN access terminal (AT) by avoiding or selectively utilizing those bandwidth portions jammed by the WAN AT/AP. For example, the technique may involve intercepting a control message from the WAN AP to the WAN AT, and determining a spectrum resource that the WAN AT will use to communicate with the WAN AP based at least in part on information (e.g., a Cell Radio Network Temporary Identifier, a Media Access Control Identifier, etc.) in the control message.

58 Claims, 14 Drawing Sheets

U.S. PATENT DOCUMENTS

| | | | |
|---|---|---|---|
| 7,764,644 B2 * | 7/2010 | Harris et al. | 370/328 |
| 7,805,156 B1 * | 9/2010 | Allen et al. | 455/550.1 |
| 7,817,592 B2 * | 10/2010 | Yun et al. | 370/328 |
| 7,852,797 B2 * | 12/2010 | Kang et al. | 370/315 |
| 7,855,977 B2 * | 12/2010 | Morrison et al. | 370/252 |
| 7,894,821 B2 * | 2/2011 | Bai et al. | 455/452.2 |
| 7,907,578 B2 * | 3/2011 | Harvey et al. | 370/338 |
| 7,924,703 B2 * | 4/2011 | Ji et al. | 370/216 |
| 7,965,785 B2 * | 6/2011 | Li et al. | 375/267 |
| 8,009,649 B1 * | 8/2011 | Ho et al. | 370/338 |
| 8,054,798 B2 * | 11/2011 | Jeong et al. | 370/331 |
| 8,155,025 B2 * | 4/2012 | Benveniste et al. | 370/252 |
| 8,179,847 B2 * | 5/2012 | Huber et al. | 370/329 |
| 2002/0128014 A1 * | 9/2002 | Chen | 455/447 |
| 2003/0013452 A1 * | 1/2003 | Hunt et al. | 455/449 |
| 2005/0153697 A1 * | 7/2005 | Patel | 455/442 |
| 2006/0002383 A1 * | 1/2006 | Jeong et al. | 370/360 |
| 2006/0019665 A1 * | 1/2006 | Aghvami et al. | 455/444 |
| 2007/0133387 A1 * | 6/2007 | Arslan et al. | 370/206 |
| 2007/0223419 A1 * | 9/2007 | Ji et al. | 370/329 |
| 2007/0223606 A1 * | 9/2007 | Yang et al. | 375/260 |
| 2007/0280188 A1 * | 12/2007 | Kang et al. | 370/338 |
| 2008/0095115 A1 * | 4/2008 | Jung | 370/331 |
| 2008/0167075 A1 * | 7/2008 | Kurtz et al. | 455/561 |
| 2008/0170497 A1 * | 7/2008 | Jeong et al. | 370/230 |
| 2008/0186885 A1 * | 8/2008 | Athalye et al. | 370/310 |
| 2008/0186939 A1 * | 8/2008 | Kim et al. | 370/343 |
| 2008/0285473 A1 * | 11/2008 | Chen et al. | 370/252 |
| 2009/0016371 A1 * | 1/2009 | Zheng et al. | 370/431 |
| 2009/0016456 A1 * | 1/2009 | Li et al. | 375/260 |
| 2009/0029645 A1 * | 1/2009 | Leroudier | 455/7 |
| 2009/0046665 A1 * | 2/2009 | Robson et al. | 370/332 |
| 2009/0067377 A1 * | 3/2009 | Talukdar et al. | 370/329 |
| 2009/0086666 A1 * | 4/2009 | Guvenc et al. | 370/328 |
| 2009/0092078 A1 * | 4/2009 | Czaja et al. | 370/328 |
| 2009/0092096 A1 * | 4/2009 | Czaja et al. | 370/331 |
| 2009/0109939 A1 * | 4/2009 | Bhushan et al. | 370/337 |
| 2009/0135761 A1 * | 5/2009 | Khandekar et al. | 370/328 |
| 2009/0147742 A1 * | 6/2009 | Tsai et al. | 370/329 |
| 2009/0197538 A1 * | 8/2009 | Borran et al. | 455/63.1 |
| 2009/0197590 A1 * | 8/2009 | Borran et al. | 455/423 |
| 2009/0197629 A1 * | 8/2009 | Borran et al. | 455/522 |
| 2009/0197631 A1 * | 8/2009 | Palanki et al. | 455/522 |
| 2009/0221295 A1 * | 9/2009 | Sahin et al. | 455/450 |
| 2009/0286509 A1 * | 11/2009 | Huber et al. | 455/410 |
| 2009/0286510 A1 * | 11/2009 | Huber et al. | 455/410 |
| 2009/0288145 A1 * | 11/2009 | Huber et al. | 726/3 |
| 2009/0288152 A1 * | 11/2009 | Huber et al. | 726/6 |
| 2009/0291690 A1 * | 11/2009 | Guvenc et al. | 455/444 |
| 2009/0298470 A1 * | 12/2009 | Huber et al. | 455/411 |
| 2009/0299788 A1 * | 12/2009 | Huber et al. | 705/7 |
| 2009/0310555 A1 * | 12/2009 | Huo et al. | 370/329 |
| 2009/0310565 A1 * | 12/2009 | Huo et al. | 370/331 |
| 2009/0310568 A1 * | 12/2009 | Chen et al. | 370/332 |
| 2009/0312024 A1 * | 12/2009 | Chen et al. | 455/437 |
| 2010/0008230 A1 * | 1/2010 | Khandekar et al. | 370/237 |
| 2010/0008244 A1 * | 1/2010 | Sampath et al. | 370/252 |
| 2010/0008325 A1 * | 1/2010 | Hartman et al. | 370/331 |
| 2010/0027521 A1 * | 2/2010 | Huber et al. | 370/338 |
| 2010/0034163 A1 * | 2/2010 | Damnjanovic et al. | 370/329 |
| 2010/0054202 A1 * | 3/2010 | Bhatt et al. | 370/329 |
| 2010/0054237 A1 * | 3/2010 | Han et al. | 370/350 |
| 2010/0056184 A1 * | 3/2010 | Vakil et al. | 455/456.5 |
| 2010/0061313 A1 * | 3/2010 | Park | 370/329 |
| 2010/0085867 A1 * | 4/2010 | Ji et al. | 370/216 |
| 2010/0085917 A1 * | 4/2010 | Gorokhov et al. | 370/328 |
| 2010/0087221 A1 * | 4/2010 | Srinivasan et al. | 455/522 |
| 2010/0093354 A1 * | 4/2010 | Agashe et al. | 455/436 |
| 2010/0136989 A1 * | 6/2010 | Westerberg et al. | 455/450 |
| 2010/0240368 A1 * | 9/2010 | Fox et al. | 455/435.3 |
| 2011/0009113 A1 * | 1/2011 | Vikberg et al. | 455/422.1 |
| 2011/0034145 A1 * | 2/2011 | Youn et al. | 455/404.1 |
| 2011/0038318 A1 * | 2/2011 | Parsons et al. | 370/328 |
| 2011/0093757 A1 * | 4/2011 | Seol et al. | 714/749 |

OTHER PUBLICATIONS

Sahin et al., "A method for Jointly Utilizing Spectrum Sensing and Scheduling Information for femtocells", Aug. 29, 2008, U.S. Appl. No. 61/093,206, 10 pages.*

International Search Report/Written Opinion—PCT/US08/087053—International Search Authority EPO—Jul. 22, 2009.

Sarperi Luciano et al., "Avoiding data channel femto-macro interference," IEEE C802.16M-08/1366R1, IEEE, US, Nov. 12, 2008, pp. 1-3, XP007908600.

Sarperi Luciano et al., "Interference mitigation for closed user groups femtocells," IEEE C802.16M-08/1315R1, IEEE US, [OnLine] Oct. 31, 2008, pp. 1-4, XP007908599. Retrieved from the Internet: URL:<http://wirelessman.org/tgm/contrib/C80216m-08_1315rl.doc>.

Taiwan Search Report—TW097150737—TIPO—Jul. 4, 2012.

* cited by examiner

OFDM Rate: $(1-\alpha)\log\left[1 + \dfrac{\Gamma}{(1-\alpha)}\right]$

TDMA Rate: $\alpha\log\left[1 + \dfrac{\alpha\Gamma}{\alpha+\Omega}\right] + (1-\alpha)\log(1+\Gamma)$

FIG. 8

| 4 users, BAF=10dB, α=0.25 | 10th Percentile | | Median | | Mean | | 90th Percentile | |
|---|---|---|---|---|---|---|---|---|
| Distance | TDMA | OFDMA | TDMA | OFDMA | TDMA | OFDMA | TDMA | OFDMA |
| 200 | 17 | 30 | 894 | 1278 | 1922 | 2305 | 5142 | 5714 |
| 400 | 215 | 367 | 3425 | 4088 | 4055 | 4678 | 8627 | 9290 |
| 600 | 283 | 1053 | 3917 | 5824 | 4448 | 6378 | 9308 | 12341 |
| 800 | 296 | 1409 | 3817 | 6191 | 4389 | 6832 | 9114 | 12787 |
| 1000 | 302 | 1430 | 3762 | 6171 | 4340 | 6768 | 9155 | 12768 |

FIG. 9

| 4 users, BAF=20dB, α=0.25 | | | | | | | | |
|---|---|---|---|---|---|---|---|---|
| | 10th Percentile | | Median | | Mean | | 90th Percentile | |
| Distance | TDMA | OFDMA | TDMA | OFDMA | TDMA | OFDMA | TDMA | OFDMA |
| 200 | 169 | 286 | 3124 | 3725 | 4057 | 4862 | 9304 | 10961 |
| 400 | 287 | 1355 | 3743 | 6377 | 4682 | 7459 | 10155 | 14518 |
| 600 | 279 | 1333 | 3871 | 6520 | 4659 | 7413 | 10008 | 14309 |
| 800 | 332 | 1507 | 3828 | 6436 | 4672 | 7457 | 9972 | 14187 |
| 1000 | 299 | 1391 | 3990 | 6631 | 4731 | 7488 | 10233 | 14343 |

FIG. 10

METHOD AND SYSTEM FOR INTERFERENCE MANAGEMENT IN A SPECTRUM SHARED BY WAN AND FEMTO CELLS

BACKGROUND

1. Field

The present application relates generally to wireless communications, and more specifically to techniques for adapting to interference in spectrums shared by WAN macro cells and femto cells.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications in their homes and offices with mobile communication devices, and a new class of small base stations has emerged, which may be installed in homes and offices to provide better indoor wireless coverage to mobile units. Such personal miniature base stations are generally known as femto access points, access point (AP) base stations, Home Node B (HNB), or Femto cells. Typically, such miniature base stations are connected to the Internet and the mobile operator's network via a digital subscriber line (DSL) router or cable modem.

Femto cells allow for cellular access where normal base station support is weak or unavailable (e.g., indoors, remote locations, and the like). Femto cells may be described as small base stations that connect to wireless service providers via a broadband backhaul link, such as DSL, cable internet access, optical fiber, T1/T3, etc., and offer typical base station functionality, such as base transceiver station (BTS) technology, radio network controller, and gateway support node services. This allows cellular devices to connect to the femto cells and utilize the wireless service. Femto cells provide significant capacity benefits and improved user experience.

Sometimes, femto cells and wide area network (WAN) macro cells share the same cellular spectrum, which may result in signal interference. Interference issues are further exacerbated by the fact that femto cells may restrict which nodes can and cannot connect to it. For example, the owner of a femto cell may want to limit its use to a set of users that he/she defines. This is in contrast to conventional cellular system wherein a user with a subscription can connect to any base station, preferably the best RF link, deployed by the operator. Such femto cells are sometimes referred to as restricted association or closed subscriber group femto cells. For example, a femto access point (AP) may be trying to serve a femto access terminal (AT) (e.g., in a femto user's house), when a WAN AT, that is restricted from accessing that Femto, comes near the femto AP/AT. The femto cell becomes susceptible to interference when the WAN AT communicates with the WAN network near the femto AP/AT, such as, for example, when a visitor to the user's house tries to make a call using his/her mobile phone. The interference may particularly affect the femto cell on certain bandwidth portions of the shared spectrum dynamically based on the scheduling actions of the WAN AP. Accordingly, there is a need for a technique to mitigate the effects of such interference associated with such bandwidth portions of the spectrum.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with managing interference in a spectrum shared by a WAN macro cell and a femto cell. In particular, described herein are method and systems for adapting to the presence of a WAN interferer, i.e., a jamming WAN access terminal (AT), by avoiding or selectively utilizing those bandwidth portions jammed by the interferer. For example, the WAN interferer may be dealt with by a femto access point (AP) by intercepting a control message between the interferer and a WAN AP. An example of such a control message could be an uplink (AT→WAN AP) assignment message made by the WAN AP to the WAN AT, commanding it to transmit on the uplink along with the associated attributes (e.g. bandwidth, modulation, coding, power etc.) for that transmission.

In related aspects, there is provided a method that may generally involve detecting a WAN AT in a coverage area of the femto cell, and accessing (e.g., intercepting) a control message sent by a WAN AP to the WAN AT. The method may further involve determining a first resource of the spectrum that the WAN AT will use to communicate with the WAN AP based at least in part on the control message, and assigning a second resource of the spectrum to a femto AT in the coverage area based at least in part on the determined first resource.

If the interferer jams a first bandwidth portion of the spectrum to which the interferer is assigned by the WAN AP during a first occurrence of an interlace, the femto AP may infer a second bandwidth portion to which the interferer will be assigned during a second occurrence of the interlace. The inference may be based at least in part on sector ID data, hopping scheme in use at the WAN AP and system time data in the intercepted control message and, in addition, the intercepted assignment message. The femto AP may assign the femto AT user to an unjammed bandwidth portion of the spectrum that comprises an available bandwidth portion other than the second bandwidth portion.

In related aspects, in response to detecting a signal energy level on the second bandwidth portion that exceeds a defined upper limit, the femto AP may treat data transmitted on the second bandwidth portion as erasure when decoding. In additionally related aspects, the femto AP may determine the first bandwidth portion to which the interferer is assigned during the first occurrence of the interlace, and may additionally infer the second bandwidth portion based at least in part on the determined first bandwidth portion.

In further related aspects, for uplink interference management, the femto AP can intercept the assignment made by the WAN AP to the WAN AT and then avoid the bandwidth or use it as described herein. The femto AP is preferably capable of receiving on the downlink from the WAN AP, and the WAN AT preferably lets the WAN AP know its identifier with the WAN AP. This will allow the femto AP to successfully decode assignments made to the WAN AT. In further related aspects, certain WAN AT transmissions can take place without an assignment. Examples are retransmissions of unsuccessful packets or persistent assignments. Furthermore, these transmissions can hop to different bandwidths with each successive transmission. In these cases, femto AP can infer based on the first assignment or gets additional information from the WAN AT. It may also make use of knowledge of WAN AP parameters such as cell ID, uplink BW configuration, etc.

In yet further related aspects, there is provided a device or apparatus for interference management in a frequency spectrum shared by a WAN macro cell and a femto cell, comprising: a transceiver supporting a communication link with at least one femto AT in a coverage area of the femto cell; at least one processor in operative communication with the transceiver; and a memory in operative communication with the at least one processor. The memory may include executable code for the at least one processor to: (a) detect a WAN AT in the coverage area; (b) access a control message sent by a WAN AP to the WAN AT; (c) determine a first resource of the spectrum that the WAN AT will use to communicate with the WAN AP based at least in part on the control message; and (d) assign a second resource of the spectrum to the at least one femto AT based at least in part on the determined first resource.

A Femto system design, in terms of slot and frame structure, timeline may be undertaken based on the above principles. For example, in order for the Femto to react to interference that will be created by an uplink WAN assignment to an interfering WAN AT, the Femto timeline from uplink assignment to uplink transmission would need to be shorter than the timeline of the WAN. This would often be feasible, because the task of scheduling in the Femto AP is often far less complex in the WAN, since it deals with very few users.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 8 illustrates exemplary approaches for calculating the data communication rates for the two approaches shown in FIG. 7.

FIGS. 9 and 10 provide tables with data regarding the overall data communication rates achieved by the approaches shown in FIG. 7 for a multi femto user case.

DETAILED DESCRIPTION

Figure 1:
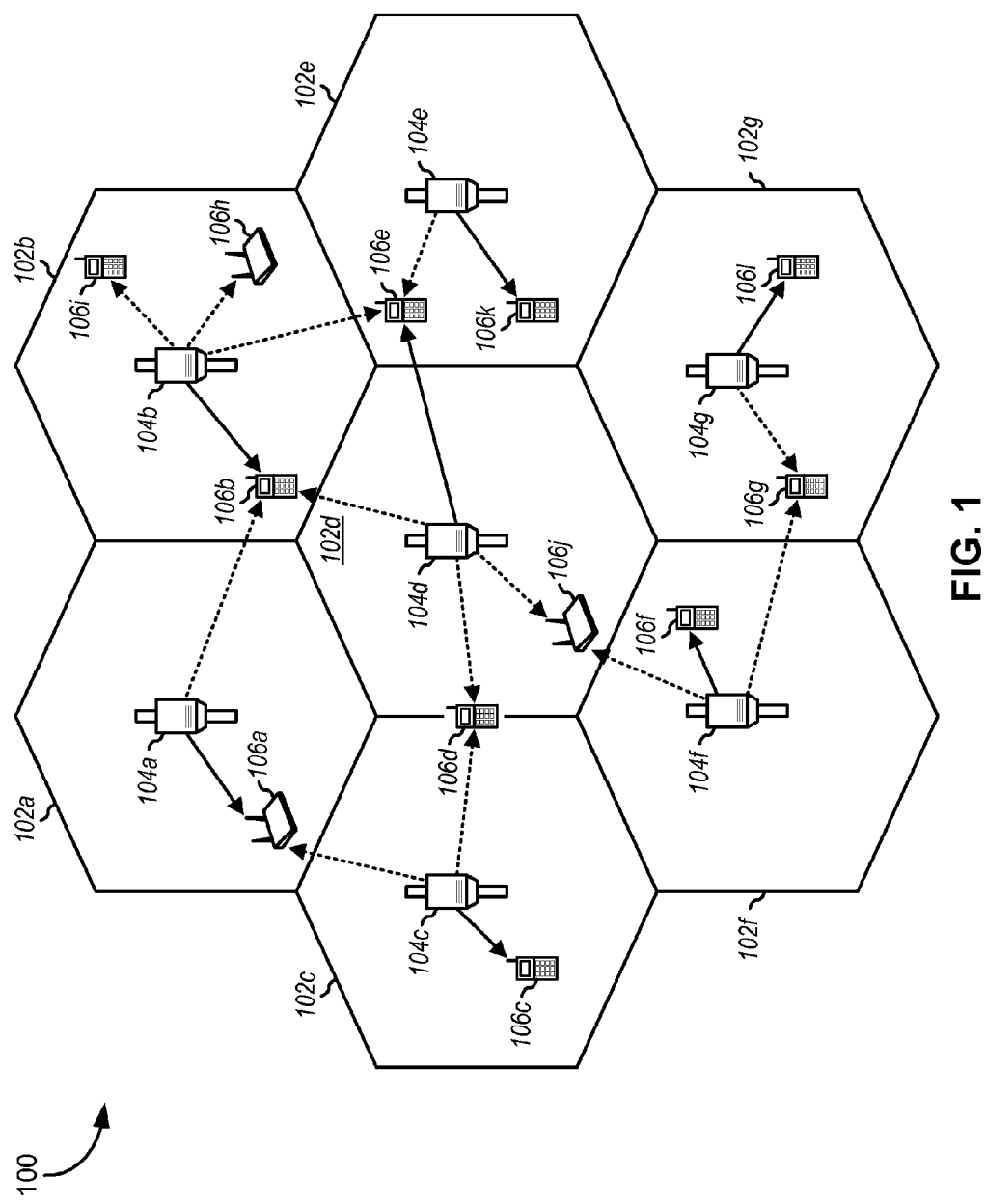
FIG. 1 illustrates an exemplary wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

Femto access points (APs) can be deployed to individual consumers and placed in homes, apartment buildings, office buildings, and the like. A femto AP can communicate with a cellular device in range of the femto AP utilizing a licensed cellular transmission band. Further, femto APs are connected to a core cellular network by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, optical fiber or like connection. The connection between the IP line and the cellular network can be a direct connection, or by way of the Internet. A femto AP therefore, can provide cellular support to a cellular handset and route cellular traffic (e.g., voice, data, video, audio, Internet, and so on) to a macro cellular network through the IP connection. This mechanism can save consumers air time costs and reduce a network provider's cellular network traffic load. Also, cellular coverage inside a home, office building, apartment, etc. can be greatly improved via implementation of the femto AP.

Although a femto AP is capable of forming a cellular link (e.g., a wireless link utilizing one or more licensed radio network frequencies) with multiple cellular devices, a consumer typically desires only his/her own traffic (or those that he/she allows) to be carried by a private IP connection connected to the femto AP. For instance, consumers may wish to preserve IP bandwidth for their own use, rather than for the use of other mobile device users. As a result, a femto AP is generally associated only with a single mobile handset or group of handsets; traffic related to such handset(s) is routed over the consumer's IP connection, whereas traffic related to other devices is blocked or otherwise not carried through. Consequently, although the femto AP can communicate with multiple handsets regardless of subscriber, the femto AP is typically programmed to disallow devices that are not associated with a particular consumer. This aspect of femto cell operation is referred to as restricted association and is in contrast to macro cell operation where subscribers of an operator are allowed to connect to any base station. From an RF perspective, this means that in the macro cell case, the handset can connect to the "best" base station whereas this may not be always feasible for the femto cell case.

FIG. 1 illustrates an exemplary wireless communication system 100 adapted to support a number of users, in which various disclosed embodiments and aspects may be implemented. As shown in FIG. 1, by way of example, system 100 provides communication for multiple cells 102, such as, for example, macro cells 102a-102g, with each cell being serviced by a corresponding access point (AP) 104 (such as APs 104a-104g). Each cell may be further divided into one or more sectors. Various access terminals (ATs) 106, including ATs 106a-106k, also known interchangeably as user equipment (UE), are dispersed throughout the system. Each AT 106 may communicate with one or more APs 104 on a forward link (FL) and/or a reverse link (RL) at a given moment, depending upon whether the AT is active and whether it is in soft handoff, for example. The terms downlink and uplink may be used interchangeably with forward and reverse link, respectively. The wireless communication system 100 may provide service over a large geographic region, for example, macro cells 102a-102g may cover a few blocks in a neighborhood.

Figure 2:
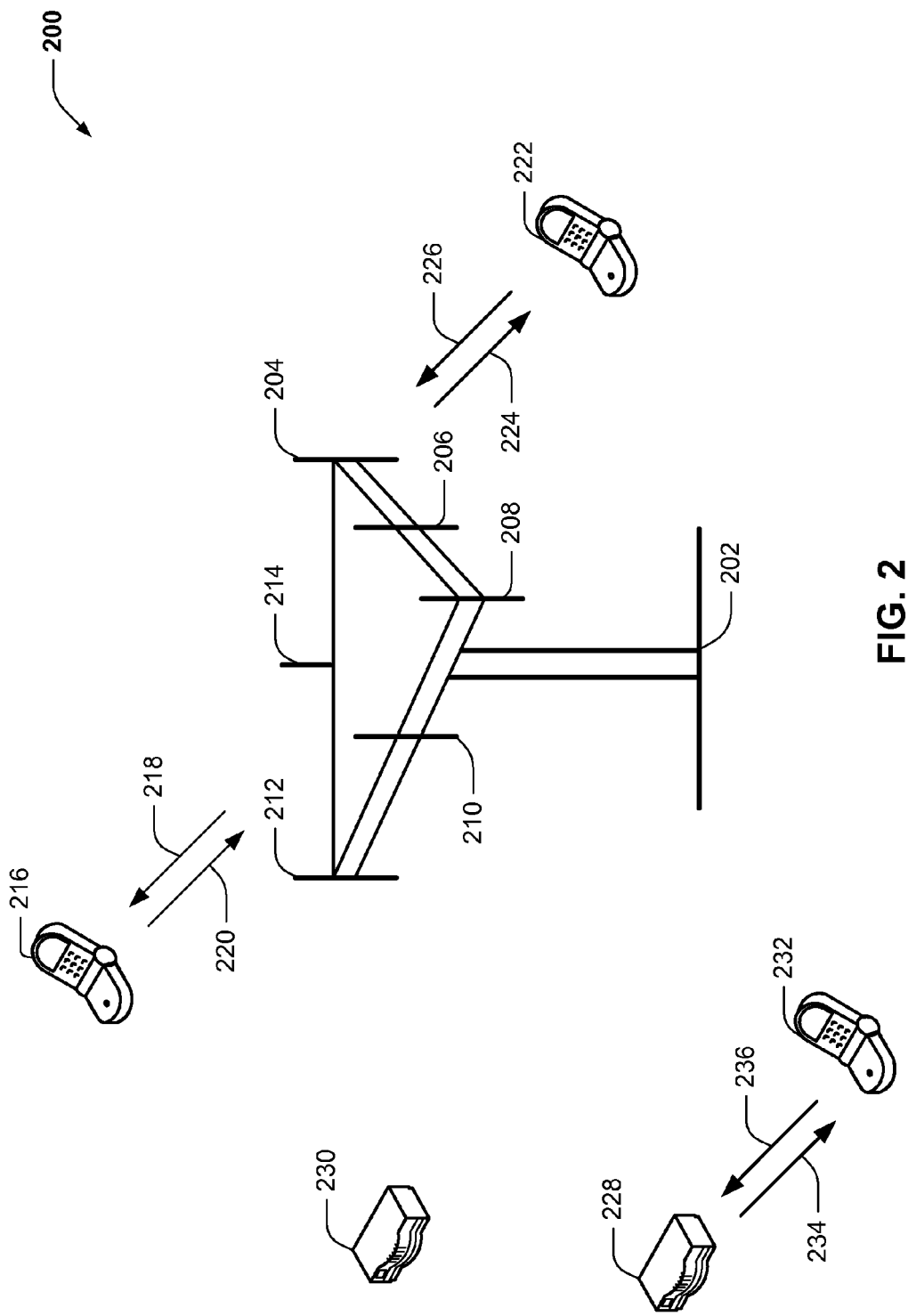
FIG. 2 is an illustration of a wireless communication system in accordance with various aspects set forth herein.

Referring now to FIG. 2, a wireless communication system 200 is illustrated in accordance with various embodiments presented herein. System 200 comprises a base station or WAN AP 202 that can include multiple antenna groups. For example, one antenna group can include antennas 204 and 206, another group can comprise antennas 208 and 210, and an additional group can include antennas 212 and 214. Two antennas are illustrated for each antenna group; however, more or fewer antennas can be utilized for each group. WAN AP 202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

WAN AP 202 can communicate with one or more ATs such as AT 216 and AT 222; however, it is to be appreciated that WAN AP 202 can communicate with substantially any number of AT similar to ATs 216 and 222. ATs 216 and 222 can be, for example, cellular phones, smart phones, laptops, handheld communication devices, handheld computing devices, satellite radios, global positioning systems, PDAs, and/or any other suitable device for communicating over wireless communication system 200.

As depicted in FIG. 2, AT 216 is in communication with antennas 212 and 214, where antennas 212 and 214 transmit information to AT 216 over a forward link 218 and receive information from AT 216 over a reverse link 220. Moreover, AT 222 is in communication with antennas 204 and 206, where antennas 204 and 206 transmit information to AT 222 over a forward link 224 and receive information from AT 222 over a reverse link 226. In a frequency division duplex (FDD) system, forward link 218 can utilize a different frequency band than that used by reverse link 220, and forward link 224 can employ a different frequency band than that employed by reverse link 226, for example. Further, in a time division duplex (TDD) system, forward link 218 and reverse link 220 can utilize a common frequency band and forward link 224 and reverse link 226 can utilize a common frequency band.

Each group of antennas and/or the area in which they are designated to communicate can be referred to as a sector of WAN AP 202. For example, antenna groups can be designed to communicate to ATs in a sector of the areas covered by WAN AP 202. In communication over forward links 218 and 224, the transmitting antennas of WAN AP 202 can utilize beamforming to improve signal-to-noise ratio of forward links 218 and 224 for ATs 216 and 222. Also, while WAN AP 202 utilizes beamforming to transmit to ATs 216 and 222 scattered randomly through an associated coverage, ATs in neighboring cells can be subject to less interference as compared to a WAN AP transmitting through a single antenna to all its ATs. Moreover, ATs 216 and 222 can communicate directly with one another using a peer-to-peer or ad hoc technology in one example.

Similar functionality of the WAN AP 202 can be implemented in femto cells or femto APs 228 and 230, which can be deployed in smaller scale locations, such as a residence or office building for example. As mentioned, the femto APs 228 and 230 can have a broadband backhaul link to a wireless service provider, such as over DSL, cable, T1/T3, etc., and can provide wireless communication service to one or more ATs. As shown, femto AP 228 can communicate with one or more ATs 232 over a forward link 234 and receive communication from the ATs 232 over a reverse link 236 similarly to the WAN AP 202.

According to an example, femto AP 230 can be deployed to provide wireless service access. Femto AP 230 can connect to a wireless service access provider via broadband backhaul link, one or more disparate femto cells or macro cells over-the-air (OTA), etc. Upon being deployed, femto AP 230 can optionally self-configure to avoid interference with surrounding femto cells (e.g., femto AP 228) and macro cells (e.g., WAN AP 202 or a sector/cell thereof). In this regard, the femto AP 230 can receive signals from the WAN AP 202 and disparate femto AP 228 much like ATs 216, 222, and 232. The signals can be overhead system broadcast messages that can be utilized by the femto AP 230 to determine configuration parameters utilized by the disparate femto cell AP and/or WAN AP 202.

The configuration parameters can be determined by the femto AP 230 for similar environment configuration. In addition, the parameters can be determined and utilized to ensure the femto AP 230 selects different parameters to mitigate interference. These parameters can include, for example, a physical cell ID and associated physical layer broadcast/synchronization signals, a pseudo-noise (PN) offset, and/or the like, for the femto AP 228, WAN AP 202, and/or substantially any other surrounding transmitters. The femto AP 230 can accordingly self-configure its channel identifier, PN offset, etc. so as not to interfere/coincide with the surrounding femto cells and macro cells. Additionally, the femto AP 230 can utilize this information to build a neighbor list of surrounding femto cells and macro cells to facilitate hard and soft handoffs for devices communicating with the femto AP 230. Moreover, the femto AP 230 can receive RF signals, for example, from the femto AP 228 and/or WAN AP 202 to determine timing, location, and/or the like.

As previously mentioned, sometimes femto cells and WAN macro cells share the same cellular spectrum, which can result in interference. Consider the scenario wherein a WAN AT is in the vicinity of a femto AP, wherein the WAN AT is restricted from connecting to the femto AP. In this case, the WAN AT is forced to connect to the potentially distant WAN AP. On the uplink, this means that whenever the WAN AT transmits to the WAN AP, it is likely to cause considerable interference to the femto AP, thus hindering the femto AP's reception of a desired transmission from a femto AT. Similarly, on the downlink, the femto AP's transmission may cause considerable interference to the WAN AT's reception of a transmission from the WAN AP. This can be particularly harmful if the WAN AT is far (in the RF sense) from the WAN AP, thus making it sensitive to interference. On the uplink, the interference may particularly affect the femto cell on certain bandwidth portions of the shared spectrum, typically those bandwidth portions to which the WAN interferer/jammer is assigned by the WAN AP. In some embodiments, the Femto operation could be in TDD mode on the reverse link frequency of the WAN AP. If this were the case, then both the downlink and uplink transmissions of the Femto are impacted by the transmissions of the WAN AT. Techniques described herein to handle receptions at the Femto AP, can, in turn, also then be applied to the Femto AT to protect it from interference from the WAN AT. In these cases, the Femto AP may need some feedback from the Femto AP about the interference conditions it faces. For example, if the Femto AP can command the Femto AT to listen to the downlink assignment channels and depending on whether and when the WAN AT gets scheduled, determine whether it can safely (in terms of interference) receive from the Femto AP. The techniques described herein address the need for a technique to methods and systems for mitigating the effects of such interference.

Figure 3:
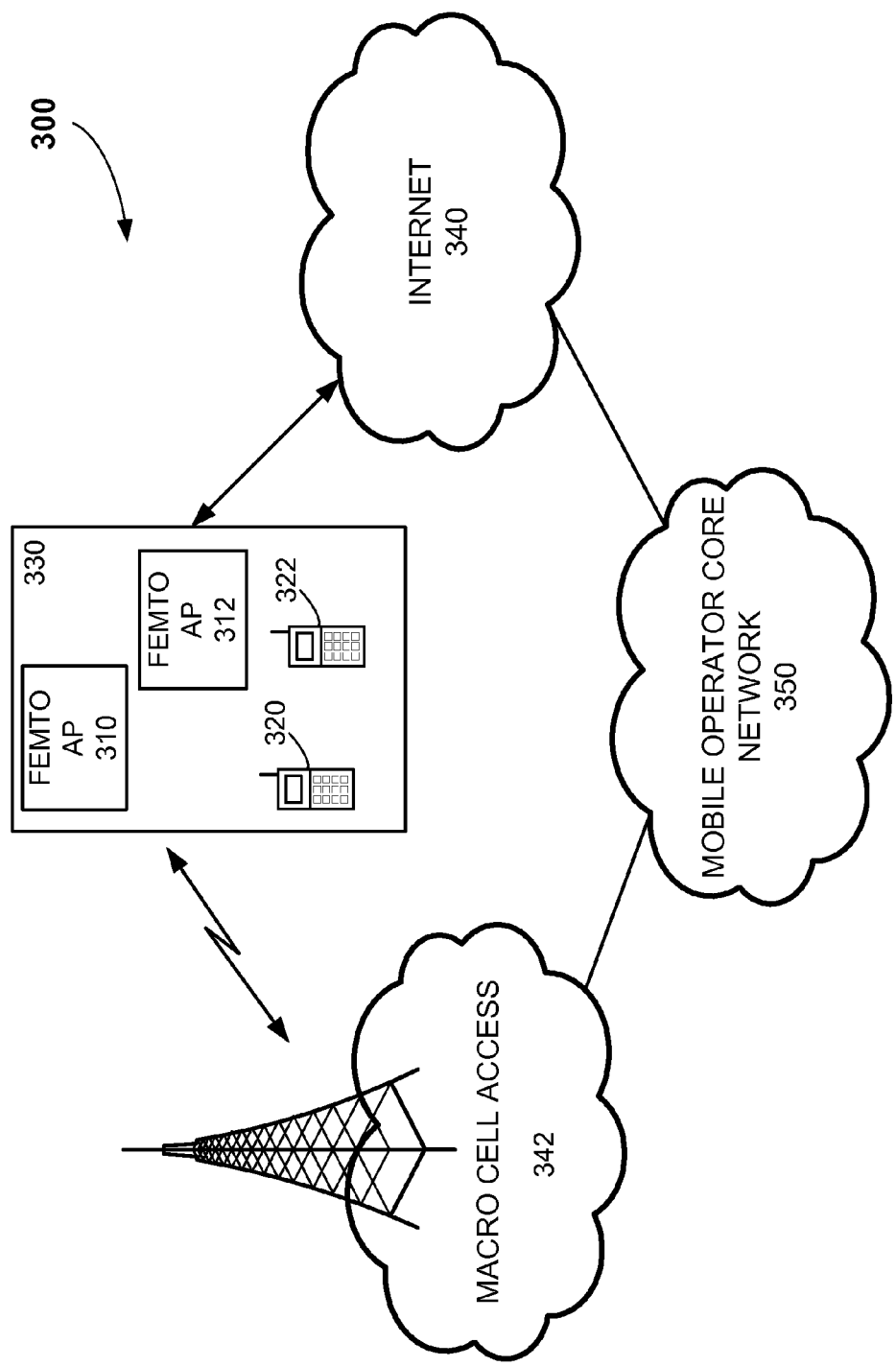
FIG. 3 illustrates an exemplary communication system with femto APs deployed within a network environment that includes a femto cell and a WAN macro cell.

FIG. 3 illustrates an exemplary communication system to enable deployment of access point (AP) base stations or femto APs within a network environment. The illustrated system 300 includes multiple AP base stations, such as, for example, femto APs 310, 312, each being installed in a corresponding small scale network environment, such as, for example, in one or more user residences 330, and being adapted to serve associated, as well as alien, ATs 320, 322. Each femto AP 310, 312 is further coupled to the Internet 340 and a mobile operator core network 350 via a DSL router (not shown) or, alternatively, a cable modem (not shown).

Although embodiments described herein use 3GPP terminology, it is to be understood that the embodiments may be applied to 3GPP (Rel99, Rel5, Rel6, Rel7) technology, as well as 3GPP2 (1xRTT, 1xEV-DO Rel0, RevA, RevB) technology and other known and related technologies. In such embodiments described herein, the owner of the femto AP 310 may subscribe to mobile service, such as, for example, 3G mobile service, offered through the mobile operator core network 350, and the AT 320 is capable of operating both in a macro cellular environment and in a residential small scale network environment. Thus, the femto AP 310 may be backward compatible with any existing AT 320.

According to related aspects, there are provided system and methods for interference management in a spectrum shared by a WAN macro cell and a femto cell. The WAN macro cell may be based on Ultra Mobile Broadband (UMB), Long Term Evolution (LTE), Worldwide Interoperability for Microwave Access (WiMAx), UMTS-High Speed Packet Access (HSPA) etc. The system may comprise WAN macro cells and femto cells deployed within the same general geographical area that reuse the same carrier as the WAN system. The WAN system may use legacy technology, such as, for example, UMB, while the femto system may use a new technology, such as, for example, an evolved version of UMB that supports femto operation efficiently.

For expediency, the techniques for managing such interference will be explained in the exemplary context of a femto cell operating in TDD mode on the RL of the macro carrier. It is noted, however, the interference management techniques described herein are also applicable to femto cells operating in FDD mode, etc. Since the femto cell of the present example is based on evolved technology, it is assumed that it will have hooks to minimize the interference it causes to the legacy WAN system and to handle interference among femto cells. However, the performance of the femto system may be susceptible to interference from WAN users that it cannot control.

With reference once again to FIG. 3, in one exemplary embodiment, AT 320 may comprise a femto AT, while AT 322 may comprise a WAN AT. The system 300 may include a femto AP 310 trying to serve a femto AT 320 within a house. Another AT in the same room, a visitor or WAN AT 322 (e.g., belonging to someone visiting the house), may make a call through the WAN network 342. It is noted that the WAN AT 322 may not be allowed to connect through the femto AP 310 due to restricted association to the femto cell. Femto cells are typically private cells on licensed spectrum, so restricted association is typically the operational model. The WAN AT 322 connecting through the WAN network 342 may cause significant interference to the femto cell, particularly when the femto AP 310 has no mechanism to make the WAN AT 322 reduce the interference it causes. Accordingly, the techniques described herein address the need for the femto AP 310 or the like to adapt to the presence of a jamming WAN AT 322.

According to further related aspects, aspects of wireless communication may be exploited for interference management. With respect to a first exploited aspect of the wireless communication, the femto AP 310 and femto AT 320 may both have a WAN forward link (FL) receive chain, much like a WAN AT 322. That is, the femto AP 310 and/or femto AT 320 can have a FL macro receiver, such that either or both the femto AP 310 and the femto AT 320 can decode the WAN system parameters from the WAN AP and use the decoded parameters to determine, calculate, or infer the RL hopping pattern of the UMB system or the like.

It will be appreciated that, in accordance with one or more aspects described herein, inferences can be made regarding determining communication parameters for a plurality of surrounding femto cells and/or macro cells as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The WAN FL receive chain may be used by the femto AP/AT for a variety of tasks. For example, the femto AP/AT may use the WAN FL receive chain to listen to FL transmission from the WAN, especially beacons to determine if it is authorized to use the spectrum in that area and other broadcast information. In another example, the femto AP/AT may use the WAN FL receive chain to obtain timing information. The femto AP/AT may synchronize to the beacon or synchronization channels as a common timing reference. When femto cells in a vicinity derive such timing information from a common macro AP, they can then be synchronous with each other and use that to advantage in interference management. In a further example, the femto AP may use the WAN FL receive chain to estimate the channel gain to the WAN AP 342 and to ensure that, when the femto AP 310 transmits on the RL carrier, it does not cause excessive interference to the WAN AP 342. In the alternative, or in addition, the femto AT may behave in a similar fashion as the embodiment of the femto AP described above.

With respect to a second exploited aspect of the wireless communication, the hopping pattern for WAN RL may be determined based on one or more of the sector ID, system time information, and other parameters broadcast by the WAN AP 342. This means that once an RL transmission commences, the femto AP can, given the bandwidth location of that transmission on that interlace, predict the bandwidth location to which the transmission will hop for any subsequent retransmission of that transmission. In some technologies such as LTE, based on the assignment message made by the WAN AP to the WAN AT for an uplink transmission, the Femto AP can determine the intra-subframe and inter-subframe hopping pattern. It can then anticipate interference on that bandwidth and act accordingly for any receptions it needs to make from femto AT(s). This prediction inherently contains some ambiguity since the femto AP may not know if the transmission was successful or not. For systems such as UMB and LTE, this ambiguity can be removed if the femto AP is adapted to listen to the control transmissions, assignments and acknowledgements, made by the WAN AP to the WAN AT. For example, in one embodiment, even though the WAN AT cannot connect through the femto AP, it registers its WAN identifier (e.g., Cell Radio Network Temporary Identifier (C-RNTI) in LTE, or a Media Access Control Identifier (MAC ID) in UMB) with the femto AP. This allows the femto AP to decode assignments and acknowledgements made to the WAN AT by the WAN AP. In some instances, like in LTE, the interception of the ACK (i.e., acknowledgement)/NACK (i.e., negative acknowledgement) by the WAN AP is dependent on the bandwidth used for the uplink transmission, which again is determined based on the assignment. If the air-interface frame structure of the femto AP lags that of the WAN AP by a few symbols, then, the femto AP will have adequate time to make assignments to the femto AT after having listened to the assignments and/or acknowledgements made by the WAN AP.

According to yet further related aspects, the femto AP 310 may detect the presence of a strong WAN interferer 322 in its vicinity. The femto AP 310 may then identify the bandwidth (i.e., hop port in UMB terminology, or virtual resource block in LTE terminology) being used by the strong WAN interferer 322, and determine or infer which bandwidth the interferer 322 will likely use in the next occurrence of that interlace. It is noted that, with knowledge regarding system parameters (e.g., sector ID, system time, uplink control/data bandwidth partitioning, etc.), the femto AP 310 can determine the hopping sequence or the like that will be used by the interferer 322 and the WAN AP 342. It is noted that the system parameters may include the number of CDMA control channel segments for UMB, or the split between uplink data (e.g., Physical Uplink Shared Channel or PUSCH) and control (Physical Uplink Control Channel or PUCCH) for LTE).

Once the femto AP 310 has knowledge of the interferer's assignment, the femto AP 310 may avoid scheduling one or more of its femto AT users 320 on that portion of the bandwidth. In the alternative, or in addition, the femto AP 310 may factor knowledge of the interferer's assignment into rate prediction and/or packet format selection for the femto AT from which it wishes to receive. In yet another alternative, or in addition, the femto AP 310 may treat as erasure the data transmitted by the femto AT that overlaps on the interferer's bandwidth assignment if large energy is observed. In other words, the femto AP 310 may set the reliability of the corresponding bits to zero and try to decode the packet using the remainder of the bits, in response to the femto AP 310 detecting a signal energy level on the assigned bandwidth portion is greater than a defined upper limit or level.

Again, it is noted that these interference management techniques described herein may also be used by the femto AT 320. Upon detecting interference on a bandwidth portion, the femto AT 320 may inform the femto AP 310 of the detected interference on the bandwidth portion, such that the femto AP 310 can act appropriately in scheduling.

In accordance with one or more aspects of the embodiments described herein, there is provided a femto AP or base station adapted to intercept or otherwise access a control message between a WAN AT (e.g., a WAN interferer) and a WAN AP. As explained above, a femto AP having a FL LTE/UMB receiver or the like may intercept and decode the WAN system parameters from the WAN AP, and may use the decoded parameters to determine, calculate, or infer the RL hopping pattern of the WAN system. Furthermore, if the WAN AT communicates its identifier (e.g. C-RNTI in LTE) to the femto AP, then the femto AP may decode assignment messages made by the WAN AP to the WAN AT and know exactly which bandwidth portion to expect interference on in the uplink and which bandwidth portion to be cautious in not hurting the WAN AT's reception on the downlink.

Figure 4:
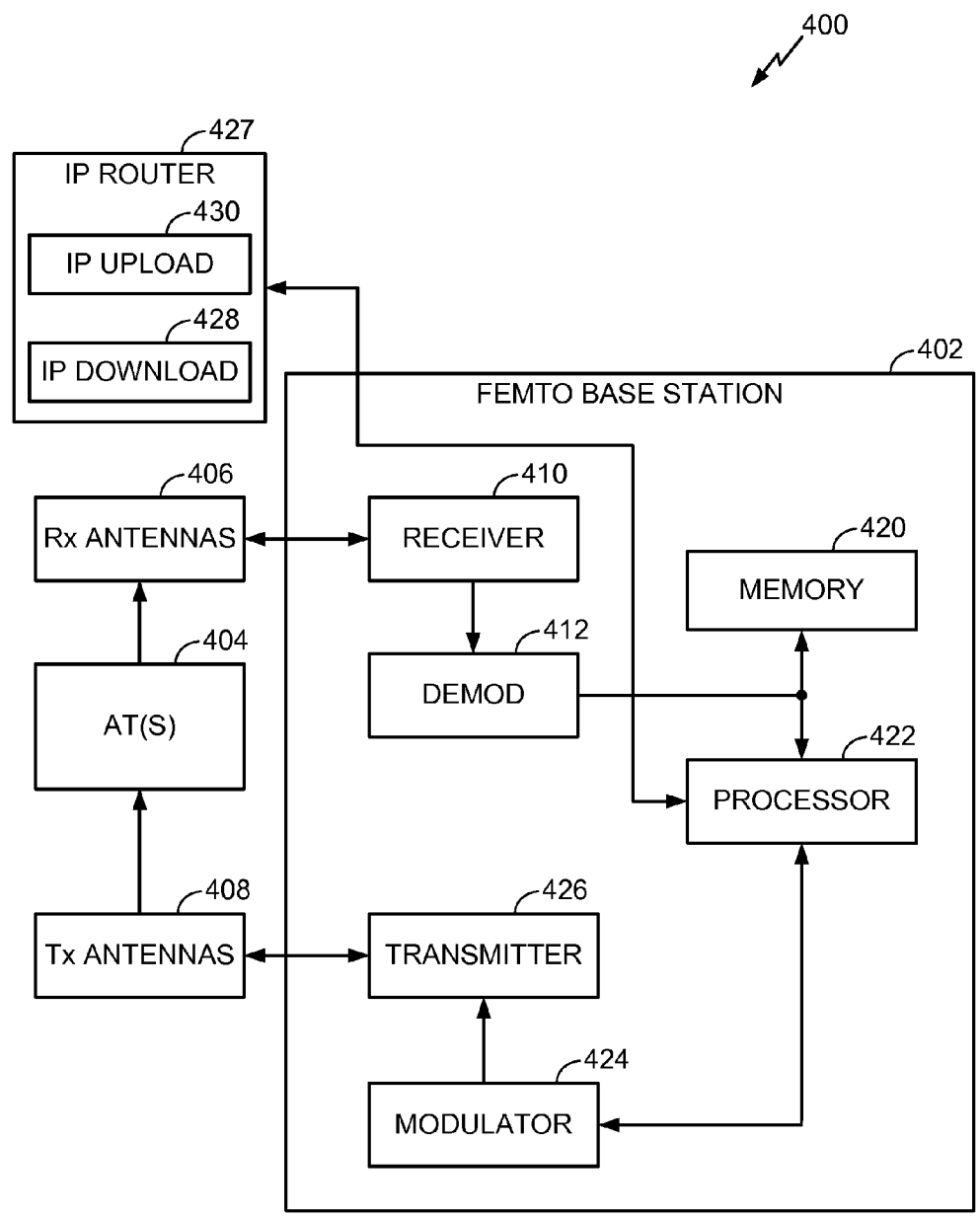
FIG. 4 depicts a block diagram of an exemplary femto AP.

With reference to FIG. 4, there is provided an exemplary system 400 comprising a femto AP 402 adapted to infer the assignment or hopping pattern of a WAN system. Femto AP 402 may include a receiver component/module 410 adapted to receive signal(s) from AT(s) 404 or from other femto APs (not depicted) through a plurality of receive antennas 406. Femto AP 402 may also include a transmitter component/module 426 adapted to transmit to the mobile device(s) 404 (or other femto APs) through one or more transmit antennas 408. Receiver component 410 may receive information from receive antennas 406 and may further comprise a signal recipient (not shown) that receives uplink data transmitted by the mobile device(s) 404. It should be appreciated that receiver component 410 and transmission component 426 may both include WLAN, BPL, Ethernet, UMTS TDD, or WLAN over UMTS TDD spectra communication capabilities in order to interact with mobile devices or with other femto APs.

Receiver component 410 may be operatively associated with a demodulator 412 adapted to demodulate received information. Demodulated symbols may be analyzed by a processor 422 to generate additional signals (e.g., in the form of transmission and/or routing instructions) modulated by modulator 424 and transmitted by transmitter component 426. Further, processor 422 may be coupled to a memory 420. Memory 420 may store information pertinent to effectuating wired and/or wireless communication, application modules for maintaining an femto network and routing information between femto APs and/or with connected mobile devices, and/or any other suitable information related to performing the various actions and functions set forth herein.

Processor 422 may route at least a portion of traffic associated with a communication link between femto AP 402 and a mobile device 404 to a neighboring femto AP (not depicted) for transfer to a cellular network (e.g., by way of a direct connection to the cellular network, or by way of the Internet). Furthermore, processor 422 may be adapted to direct traffic affiliated with the femto AP 402 (e.g., generated by a predetermined mobile device or group of mobile devices, for instance) directly to the cellular network by way of an IP upload link 430 (e.g., DSL connection, such as ADSL, VDSL, HDSL etc., cable IP connection, BPL connection). In addition, data may be received from the cellular network via an IP download link 428 (e.g., DSL, cable, BPL) and directed to a mobile device 404 affiliated with the femto AP 402. It is noted that the femto AP 402 may comprise one or more processors 422.

Receiver component 410 and transmission component 426 may receive and transmit, respectively, various information to/from a cellular network (e.g., via IP upload 430 and/or IP download 428) or to/from other femto APs of the femto network by way of an IP router 427 that communicates over unlicensed frequencies or wired connections (e.g., WLAN router, LAN router, or the like). It is noted that the receiver and transmitter components/modules 410, 426 may be part of or replaced with a transceiver module (not depicted) in other embodiments. The depicted receiver 410 and transmitter 426, or alternatively a transceiver, may be adapted to support communication links with a plurality of APs. The APs may comprise a WAN interferer jamming a first bandwidth portion of the spectrum, wherein the interferer is assigned to the first bandwidth portion by a WAN AP during a first occurrence of an interlace.

Memory 420 may contain application modules or applications that generate or comprise code/instructions for forming, maintaining and/or routing data within a femto network. The memory 420 may be in operative communication with the processor 422 and may include executable code for the processor 422 to: (a) detect a WAN AT in the coverage area; (b) access a control message sent by a WAN access point (AP) to the WAN AT; (c) determine a first resource of the spectrum that the WAN AT will use to communicate with the WAN AP based at least in part on the control message; and/or (d) assign a second resource of the spectrum to the at least one femto AT based at least in part on the determined first resource.

In one embodiment, processor 422 is adapted to intercept the control message sent by the WAN AP to the WAN AT. Processor 422 may receive information from the WAN AT that facilitates intercepting the control message. The received information may include a Cell Radio Network Temporary Identifier (C-RNTI), a Media Access Control Identifier (MAC ID), or the like.

In related aspects, processor 422 may be adapted to determine the first resource based on data relating to a forward link bandwidth configuration and/or a downlink bandwidth configuration. In the alternative, or in addition, processor 422 may be adapted to determine the first resource based on data relating to at least one of a reverse link bandwidth configuration and an uplink bandwidth configuration. It is noted that processor 422 may be adapted to determine the first resource based at least in part on sector ID data and/or system time data of the WAN AP. Processor 422 may be adapted to determine the first resource by determining a first bandwidth portion that the WAN AT will use to receive and/or transmit data from the WAN AP.

In further related aspects, processor 422 may be adapted to select the second resource based at least in part on a bandwidth portion that the WAN AT is expected to use to communicate with the WAN AP during a subsequent occurrence of an interlace. Processor 422 may be adapted to select an unjammed resource for the femto AT in response to at least the WAN AT/AP jamming at least one resource of the spectrum. Processor 422 may be adapted to calculate a bandwidth portion that will be assigned to the WAN AT during a subsequent occurrence of an interlace, wherein the unjammed resource comprises an available bandwidth portion other than the calculated bandwidth portion. It is noted that the first and second resources may comprise two different, non-overlapping bandwidth portions of the spectrum. In the alternative, the second resource may overlap at least partially with the first resource.

In still further related aspects, processor 422 may be adapted to infer the first resource that is expected to be assigned to the WAN AT during a subsequent occurrence of an interlace based at least in part information in the control message, such as, for example, the number of CDMA control channel segments or the uplink control/data bandwidth partitioning, etc. Processor 422 may be adapted to calculate whether co-assigning the first resource to the femto AT will increase a data transfer rate between the femto AT and a femto AP. The second resource may comprise the first resource when it is calculated that co-assigning the first resource to the femto AT will increase the data transfer rate. In the alternative, the second resource may comprise an available bandwidth portion of the spectrum other than the first resource when it is calculated that co-assigning the first resource to the femto AT will decrease, and/or otherwise not increase, the data transfer rate. Processor 422 may be adapted to treat as erasure any data transferred on the first resource during the subsequent occurrence of the interlace, in response to a signal energy level of the first resource exceeding a defined upper limit.

Figure 5A:
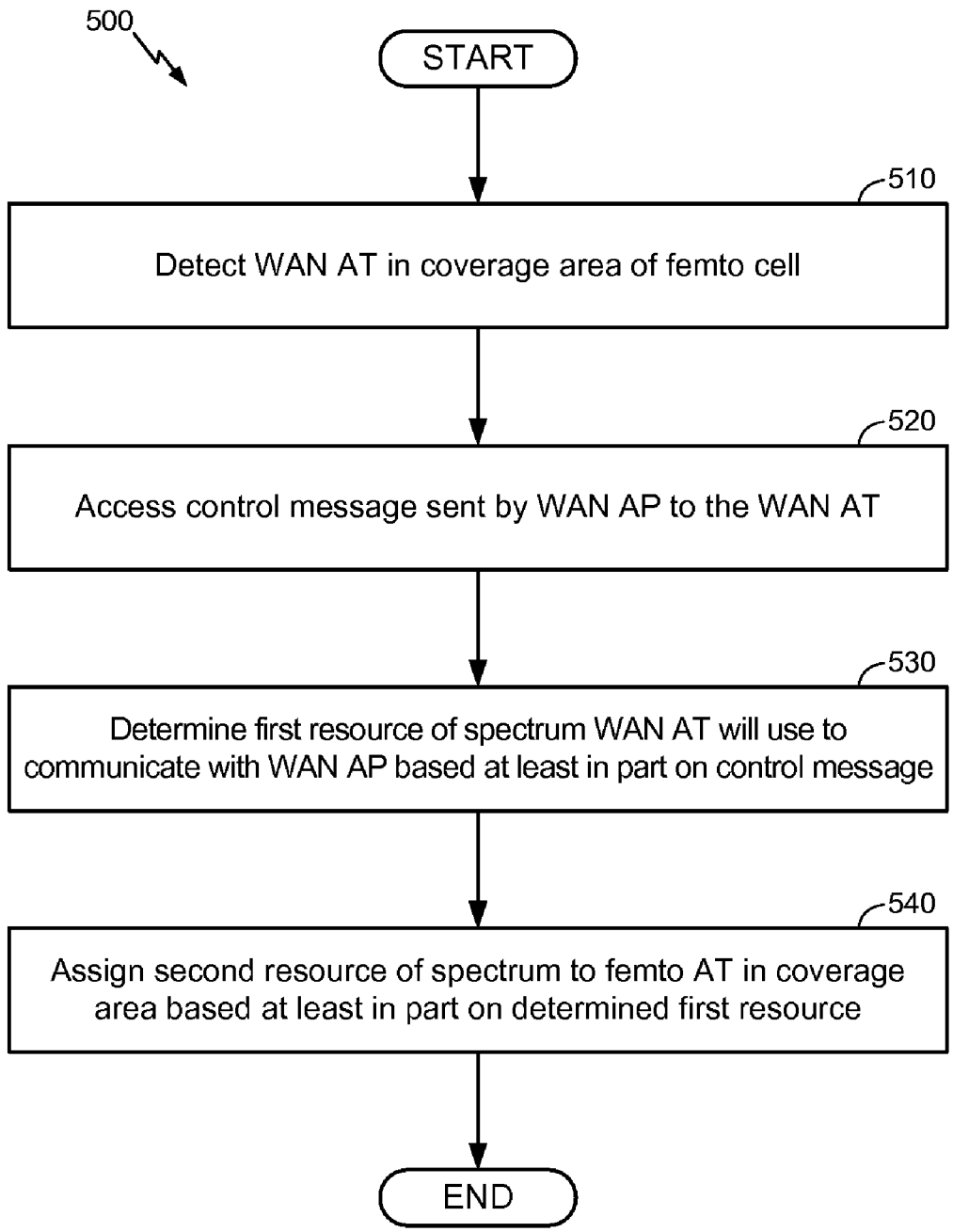
FIG. 5A depicts a flowchart of an exemplary method for handling interference in a spectrum shared by a femto cell and a WAN macro cell.

In accordance with one or more aspects of the embodiments described herein, there are provided methods for interference management in a frequency spectrum shared by a WAN macro cell and a femto cell. With reference to the flow chart shown in FIG. 5A, the method 500 may generally involve detecting a WAN access terminal (AT) in a coverage area of the femto cell (step 510). At step 520, the method may further involve accessing a control message sent by a WAN access point (AP) to the WAN AT. The method may further involve determining a first resource of the spectrum that the WAN AT will use to communicate with the WAN AP based at least in part on the control message (step 530). At step 540, the method may further involve assigning a second resource of the spectrum to a femto AT in the coverage area based at least in part on the determined first resource.

Figure 5B:
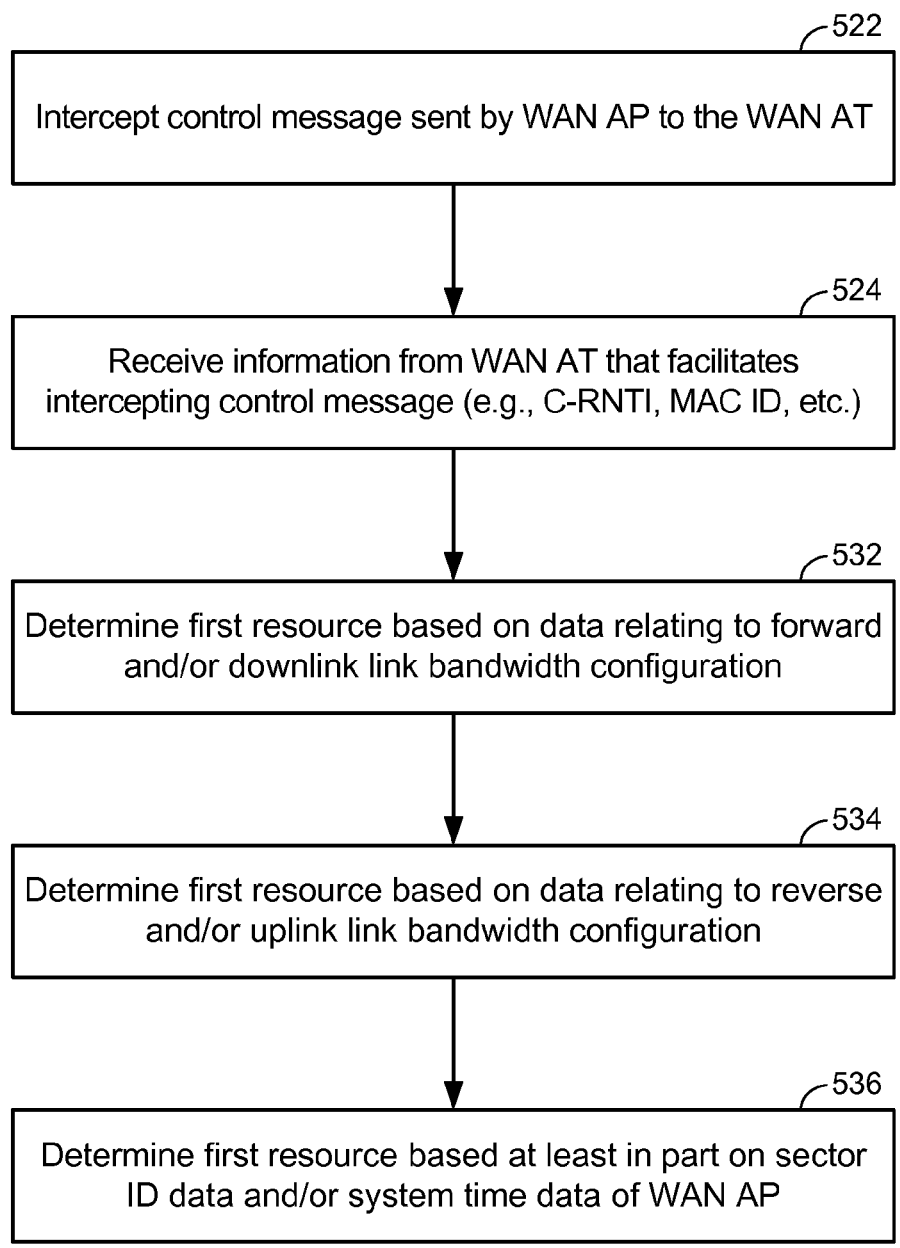
FIG. 5B shows sample aspects of the method shown in FIG. 5A.

With reference to FIG. 5B, step 520 may involve accessing comprises intercepting the control message sent by the WAN AP to the WAN AT (i.e., the interferer) (step 522). The interferer may jam a first bandwidth portion of the spectrum to which the interferer is assigned by the WAN AP during an occurrence of an interlace. The method 500 may involve inferring a second bandwidth portion to which the interferer will be assigned during a subsequent occurrence of the interlace based at least in part on sector ID data and system time data, or other similar data, in the intercepted control message. It is noted that the femto AP may listen to the acknowledgement channel from the WAN AP to the WAN AT, to determine whether the WAN AT will retransmit in the next occurrence of that interlace or not. In related aspects, step 510 may involve receiving information from the WAN AT that facilitates intercepting the control message, such as, for example, a Cell Radio Network Temporary Identifier (C-RNTI), a Media Access Control Identifier (MAC ID), or the like (step 524).

In the embodiment of FIG. 5B, step 530 may involve determining the first resource based on data relating to at least one of a forward link bandwidth configuration and a downlink bandwidth configuration (step 532). In another embodiment, step 530 may involve determining comprises determining the first resource based on data relating to at least one of a reverse link bandwidth configuration and an uplink bandwidth configuration (step 534).

In related aspects, step 530 may involve determining the first resource based at least in part on at least one of sector ID data and system time data of the WAN AP (step 536). Step 530 may involve determining a first bandwidth portion that the WAN AT will use to receive data from the WAN AP. In the alternative, or in addition, step 530 may involve determining a first bandwidth portion that the WAN AT will use to transmit data to the WAN AP.

Figure 5C:
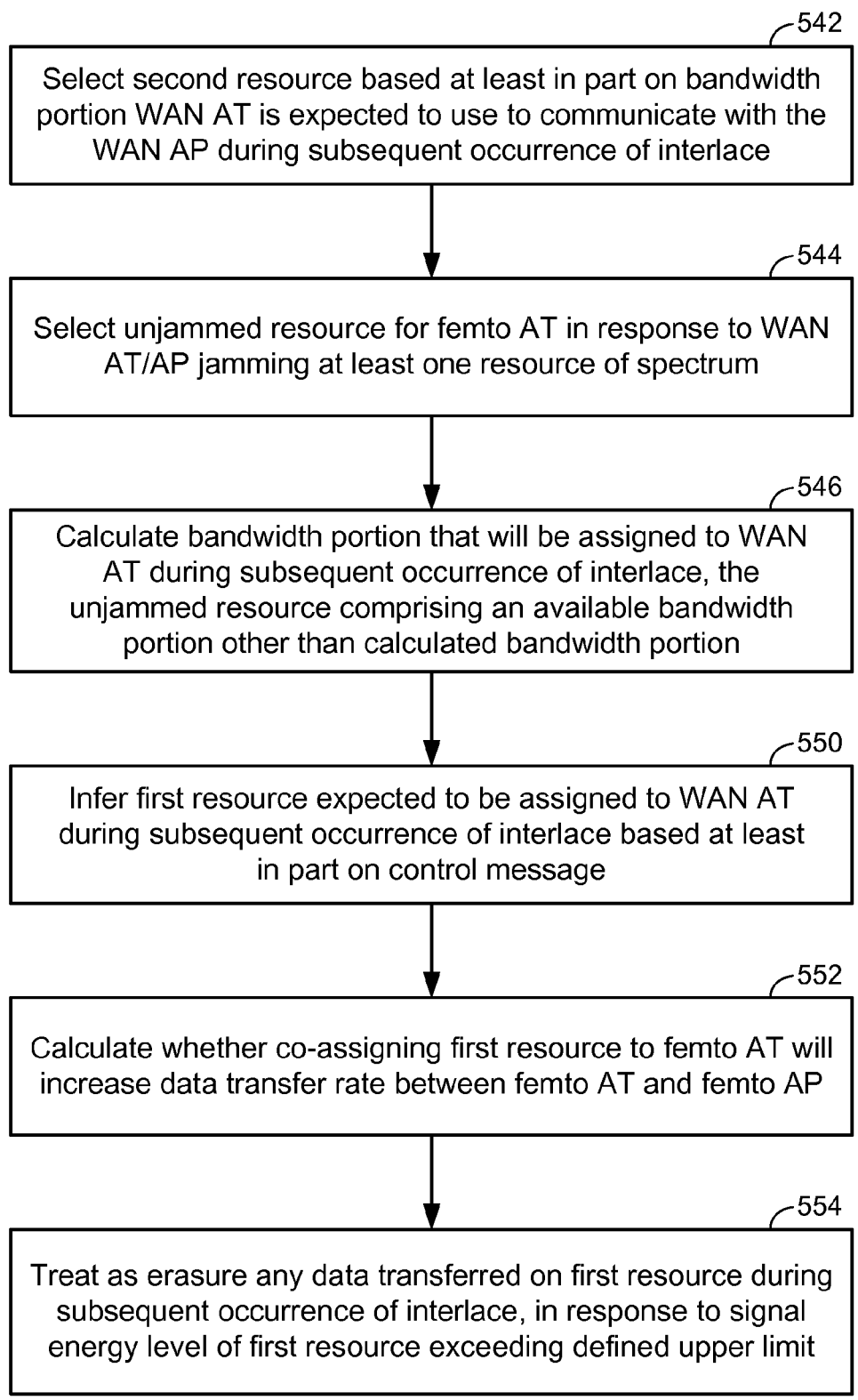
FIG. 5C shows further sample aspects of the method shown in FIG. 5A.

With reference to FIG. 5C, in one embodiment, step 540 may involve selecting the second resource based at least in part on a bandwidth portion that the WAN AT is expected to use to communicate with the WAN AP during a subsequent occurrence of an interlace (step 542). In the alternative, or in addition, step 540 may involve selecting an unjammed resource for the femto AT in response to at least one of the WAN AT and the WAN AP jamming at least one resource of the spectrum (step 544). Step 540 may further involve calculating a bandwidth portion that will be assigned to the WAN AT during a subsequent occurrence of an interlace, the unjammed resource comprising an available bandwidth portion other than the calculated bandwidth portion (step 546). It is noted that the first and second resources may comprise two different, non-overlapping bandwidth portions of the spectrum. In the alternative, the second resource may overlap at least partially with the first resource.

In another embodiment, step 530 may involve inferring the first resource that is expected to be assigned to the WAN AT during a subsequent occurrence of an interlace based at least in part on the control message (step 550). Step 530 may further involve calculating whether co-assigning the first resource to the femto AT will increase a data transfer rate between the femto AT and a femto AP (step 552). The second resource may comprise the first resource when it is calculated that co-assigning the first resource to the femto AT will increase the data transfer rate. The second resource comprises an available bandwidth portion of the spectrum other than the first resource when it is calculated that co-assigning the first resource to the femto AT will decrease or otherwise not increase the data transfer rate. In related aspects, the method 500 may involve treating as erasure any data transferred on the first resource during the subsequent occurrence of the interlace, in response to a signal energy level of the first resource exceeding a defined upper limit (554).

Figure 6A:
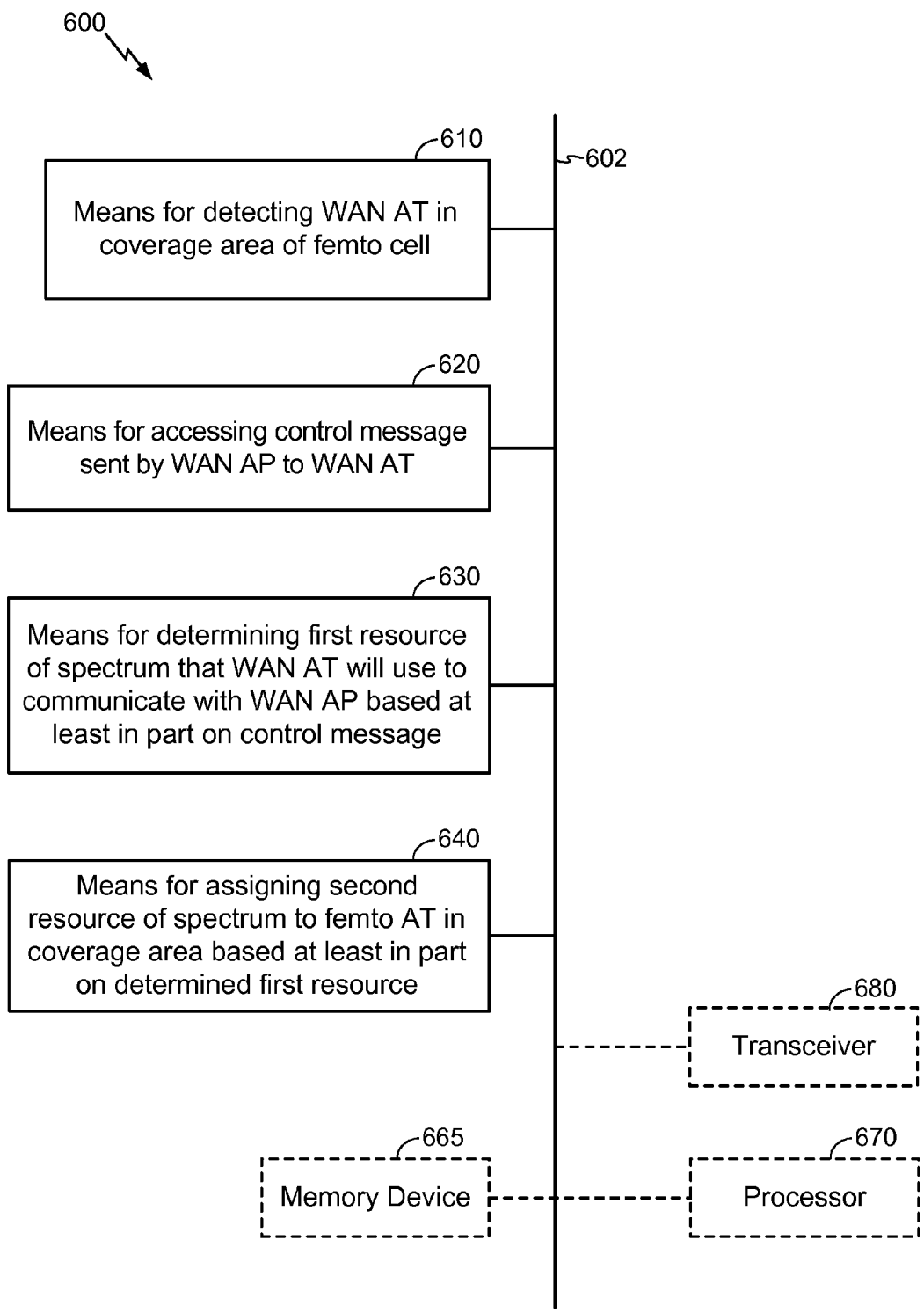
FIG. 6A illustrates one embodiment of an apparatus for handling interference in a spectrum shared by a femto cell and a WAN macro cell.

In accordance with one or more aspects of the embodiments described herein, there are provided apparatuses for interference management in a frequency spectrum shared by a WAN macro cell and a femto cell. With reference to FIG. 6A, there is provided an exemplary apparatus 600 that may be configured as either a communication terminal or device, or as a processor or similar device for use within a communication terminal or device, such as, for example, a femto AP or the like. As illustrated, apparatus 600 comprises: a means 610 for detecting a WAN access terminal (AT) in a coverage area of the femto cell; a means 620 for accessing a control message sent by a WAN access point (AP) to the WAN AT; a means 630 for determining a first resource of the spectrum that the WAN AT will use to communicate with the WAN AP based at least in part on the control message; and a means 640 for assigning a second resource of the spectrum to a femto AT in the coverage area based at least in part on the determined first resource.

Figure 6B:
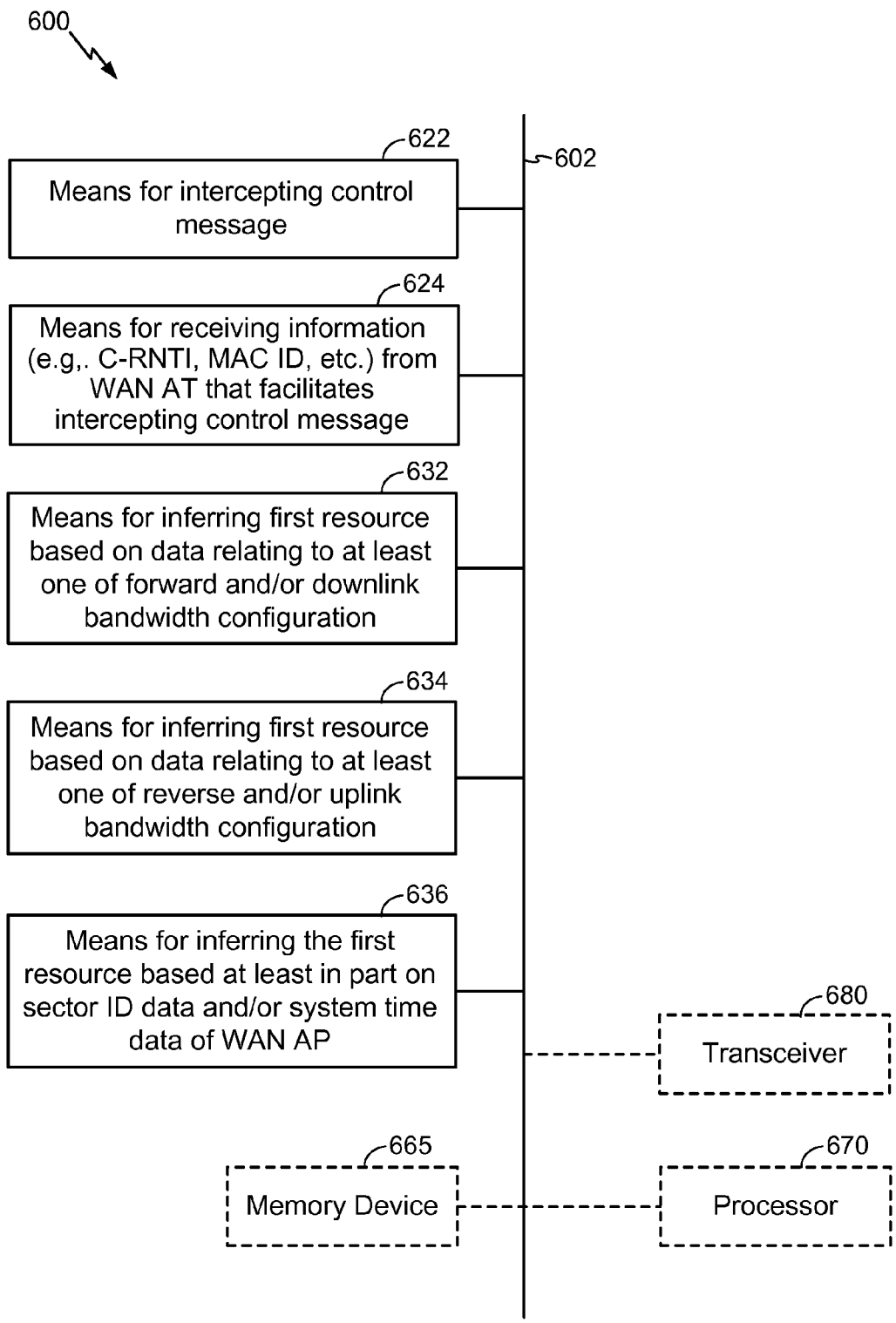
FIG. 6B shows sample aspects of the apparatus shown in FIG. 6A.

With reference to FIG. 6B, the means 620 may comprise a means 622 for intercepting the control message. The means 620 may comprise means 624 for receiving information from the WAN AT that facilitates intercepting the control message. The information received by the means 624 may include a Cell Radio Network Temporary Identifier (C-RNTI), a Media Access Control Identifier (MAC ID), or the like. Such information may be sent over-the-air and/or via a backhaul by the WAN AP to the femto AP.

The means 630 may comprise a means 632 for inferring the first resource based on data relating to at least one of a forward link bandwidth configuration and a downlink bandwidth configuration. In the alternative, or in addition, the means 630 may comprise a means 634 for inferring the first resource based on data relating to at least one of a reverse link bandwidth configuration and an uplink bandwidth configuration. It is noted that the means 630 may comprise a means 636 for inferring the first resource based at least in part on sector ID data and/or system time data of the WAN AP. It is further noted that the means 630 may comprise a means for inferring a first bandwidth portion that the WAN AT will use to receive and/or transmit data to the WAN AP.

Figure 6C:
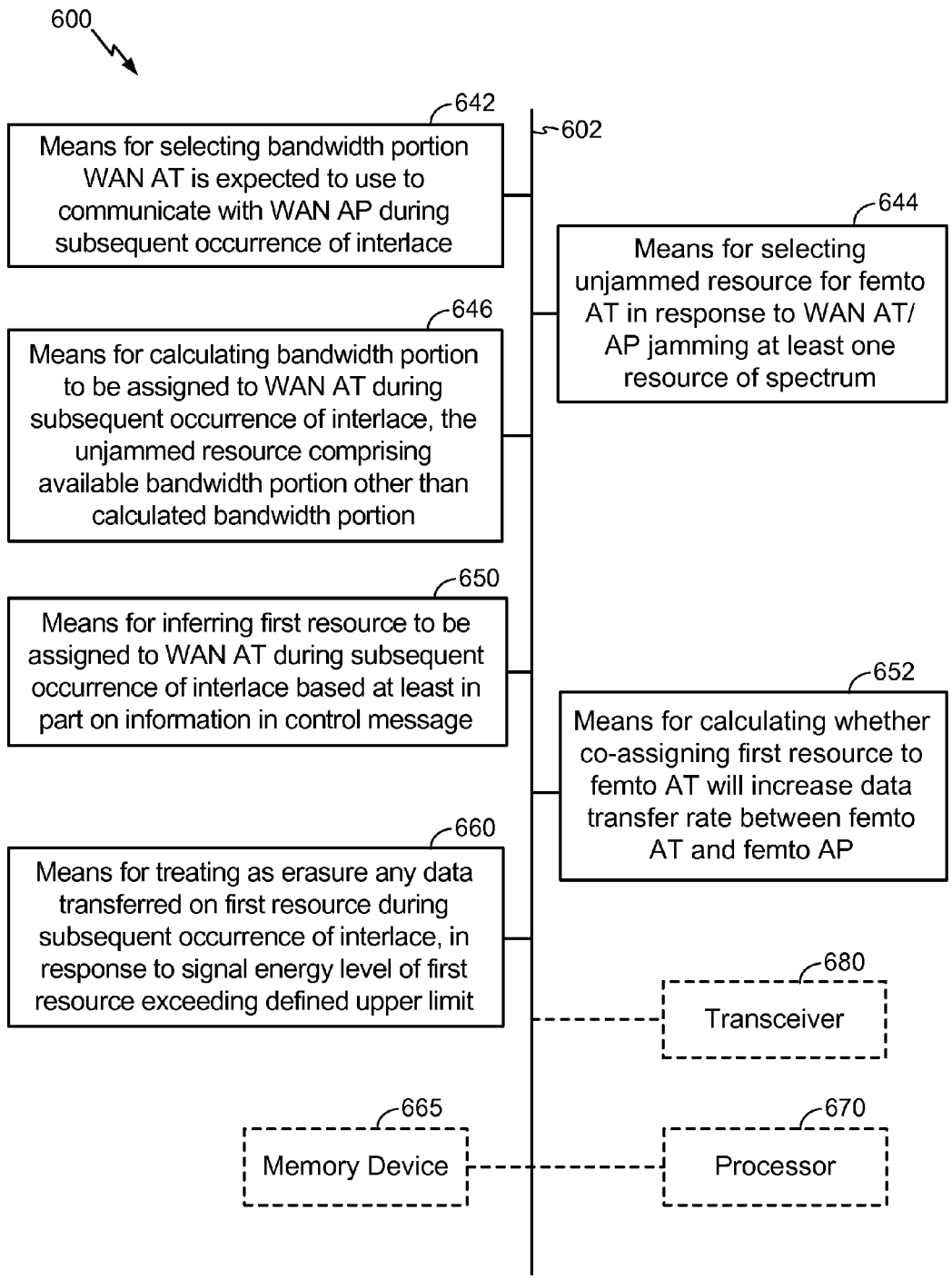
FIG. 6C shows further sample aspects of the apparatus shown in FIG. 6A.

With reference to FIG. 6C, the means 640 may comprise a means 642 for selecting a bandwidth portion that the WAN AT is expected to use to communicate with the WAN AP during a subsequent occurrence of an interlace. The means 640 may comprise a means 644 for selecting an unjammed resource for the femto AT in response to at least one of the WAN AT and the WAN AP jamming at least one resource of the spectrum. The means 640 may comprise means 646 for calculating a bandwidth portion to be assigned to the WAN AT during a subsequent occurrence of an interlace, the unjammed resource comprising an available bandwidth portion other than the calculated bandwidth portion. It is noted that the first and second resources may comprise two different, non-overlapping bandwidth portions of the spectrum. In the alternative, the second resource may overlaps at least partially with the first resource.

The means 630 may comprise a means 650 for inferring the first resource that is expected to be assigned to the WAN AT during a subsequent occurrence of an interlace based at least in part on information in the control message, such as, for example, the number of CDMA control channel segments or the uplink control/data bandwidth partitioning, etc. The means 630 may comprise a means 652 for calculating whether co-assigning the first resource to the femto AT will increase a data transfer rate between the femto AT and a femto AP. The second resource may comprise the first resource when it is calculated that co-assigning the first resource to the femto AT will increase the data transfer rate. In the alternative, the second resource may comprise an available bandwidth portion of the spectrum other than the first resource when it is calculated that co-assigning the first resource to the femto AT will decrease, and/or otherwise not increase, the data transfer rate. The apparatus 600 may further comprise means 660 for treating as erasure any data transferred on the first resource during the subsequent occurrence of the interlace, in response to a signal energy level of the first resource exceeding a defined upper limit.

Apparatus 600 may optionally include a processor 670 in the case of an apparatus 600 configured as a communication terminal, rather than as a processor. Processor 670, in such case, may be in operative communication with means 610, 620, 630, 640, 660, and components thereof, via a bus 602 or similar communication coupling. Processor 670 may effect initiation and scheduling of the processes or functions performed by means 610, 620, 630, 640, 660, and components thereof.

It is noted that the apparatus 600 may optionally include a means for storing, such as, for example, a memory device/module 665. Computer readable medium or memory device/module 665 may be operatively coupled to the other components of apparatus 600 via bus 602 or the like. The computer readable medium or memory device 665 may be adapted to store computer readable instructions and data for effecting the processes and behavior of means 610, 620, 630, 640, 660, and components thereof, or processor 670 (in the case of apparatus 600 configured as a terminal) or the methods disclosed herein. The apparatus 600 may also include a transceiver 680 or the like operatively coupled to the other components of the apparatus 600. A stand alone receiver and/or stand alone transmitter may be used in lieu of or in conjunction with the transceiver 680.

Figure 7:
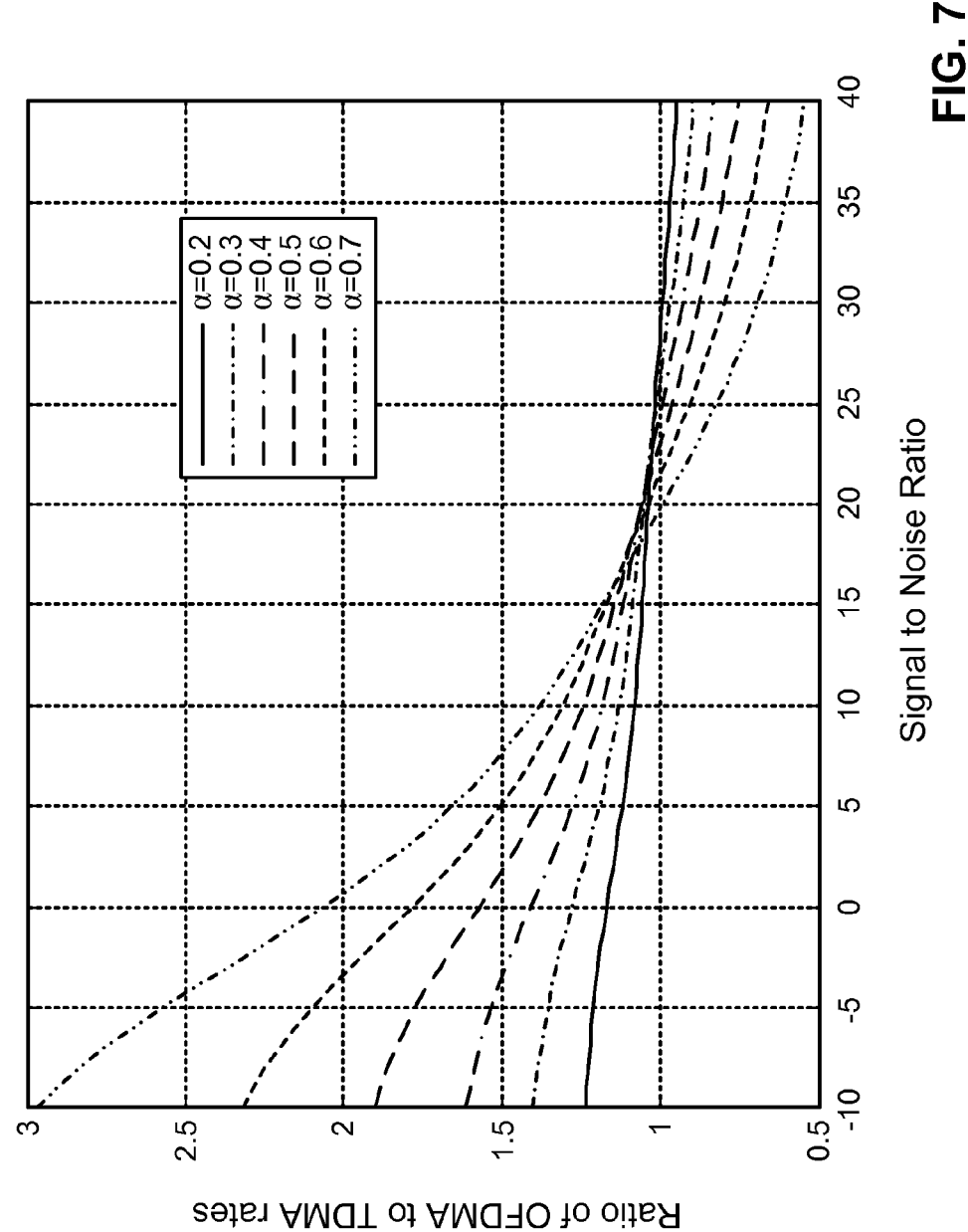
FIG. 7 depicts a graph of the ratio of data transmission rates achieved by two different approaches to handling interference caused by a WAN jammer in a single femto user case.

With reference to FIGS. 7 and 8, there is provided an exemplary application of aspects of the interference management technique to a single user case. This example illustrates scenarios when use of the jammed bandwidth by a femto AT may yield some benefit, as well as another scenarios when it is better to just leave the jammed bandwidth unused by the femto AT.

FIG. 7 provides a plot of the ratio of the data transmission rates achieved by two different bandwidth utilization approaches. In accordance with aspects of the interference management techniques described herein, the first approach involves selectively utilizing the bandwidth portions of the available bandwidth for a spectrum shared by femto and WAN macro cells. This first approach is similar to OFDMA in that both generally involve using only as much of the available bandwidth as makes sense (i.e., not using certain ones of the available bandwidth portions if doing so would result in reduced data communication rates on the spectrum). This first approach is akin to the exemplary methods shown in FIGS. 5 and 6. Data communication rates achieved by selective bandwidth utilization are referred to herein as OFDMA rates, and selective bandwidth utilization is referred to herein as the OFDMA approach.

In contact to selectively utilizing bandwidth, the second approach involves utilizing all of the available bandwidth in the spectrum shared by the femto and WAN macro cells. This second approach is similar to TDMA in that both generally involve maximizing use of the available bandwidth, rather than being selective of which portions of the bandwidth will be used to communicate data. Data communication rates achieved by such non-selective bandwidth utilization are referred to herein as TDMA rates, and non-selective bandwidth utilization is referred to herein as the TDMA approach.

With reference once again to FIG. 7, the ratio of OFDMA to TDMA rates are graphed for different portions of the spectrum bandwidth. Each $\alpha$ represents the fraction of the total bandwidth that is jammed. This ratio (on the y-axis) is plotted for different signal-to-noise ratios (on the x-axis). The plot contains different bandwidth fractions over which the interferer or jammer is present. As a reference, the total received signal power to noise power in the entire band is used in the shown example.

In the example shown in FIG. 7, the jammer is received at 20 dB above noise at the Femto AP in all cases. It is noted that the selective bandwidth utilization technique is generally desirable over the non-selective approach when the ratio of OFDMA to TDMA rates is greater than a value of one. Accordingly, in the present example, the selective bandwidth utilization technique is desirable for signal-to-noise ratios from around 20 dB to around 25 dB, depending on the bandwidth portion ($\alpha$).

The OFDMA and TDMA data transmission or communication rates may be calculated according to the terms or formulas shown in FIG. 8. In the shown example, $\Gamma$ represents the received signal-to-noise ratio, while $\Omega$ represents the jammer-to-noise ratio. It is noted that the selective bandwidth utilization technique (resulting in the OFDMA data communication rate) can be prevented from performing worse than non-selective bandwidth utilization technique by determining when using all or part of the jammed bandwidth will increase/decrease the data transmission rate.

With reference to FIGS. 9 and 10, there is provided an exemplary application of aspects of the interference management technique to a multi femto user case. In this scenario, there is a WAN AP at an origin and the femto AP is placed at various distances from the WAN AP. ATs are placed around the femto AP. The femto AP may be assumed to be inside a building and a building attenuation factor (BAF) may be applied. A scheduler may intelligently decide (a) whether to use the bandwidth over which it sees the jammer and/or (b) which user to assign if it decides to use the jammed bandwidth.

For example, for the OFDMA approach, the bandwidth may be broken up into thirty-two parts (five bits). The scheduler may assign the weakest users (i.e., those users with the least amount of tolerance to interference on the jammed bandwidth) to the unjammed bandwidth(s). The jammed bandwidth may be assigned to a given user if that user's overall rate will improve with the assignment. If none of the users' rates are expected to improve with the jammed bandwidth assignment, then the jammed bandwidth may be left unused. Sample results for BAF=10 dB (i.e., when the jammer is at 10 dB over thermal on quarter bandwidth) and BAF=20 dB (i.e., when the jammer is at 20 dB over thermal on quarter bandwidth) are shown in FIGS. 9 and 10, respectively.

With continued reference to FIGS. 9 and 10, one observation is that, even at a distance (i.e., distance between the WAN AP and the femto AP) that is low, the OFDMA approach begins to outperform the TDMA approach (e.g., greater than 70% improvement even at 200 m). This may be explained by the fact that for the same total power being poured into the spectrum, the OFDMA approach involves choosing to either avoid or put power in the jammed bandwidth intelligently. Under the OFDMA approach, when one chooses to put power on the jammed bandwidth, it assigns this jammed bandwidth to a user for whom the data transmission rate will actually improve. In contrast, the TDMA approach generally involves pouring the power over the entire bandwidth, equally or otherwise, rather than selectively over portions of the bandwidth. Another observation is that, as the distance between the WAN AP and the femto AP increases, the OFDMA approach is characterized as having the benefit of being able to pour more power into the used bandwidth portions.

Since the femto or LAN system generally cannot make a WAN user back off or not use a given bandwidth portion, the techniques described herein allow the femto system to use an unjammed bandwidth portion and/or selectively the jammed bandwidth portion, and thereby adjust to the presence of the WAN user. As such, the selective bandwidth utilization approach described herein allows a femto system to achieve more robust data delivery in the presence of the WAN jammer/interferer.

While this application describes particular examples of the present invention, those of ordinary skill can devise variations of the present invention without departing from the inventive concept. For example, the teachings herein refer to circuit-switched network elements but are equally applicable to packet-switched domain network elements. It is noted that the word "exemplary" is used herein to mean "serving as an example, instance, or illustration." Any embodiment described herein as "exemplary" is not necessarily to be construed as preferred or advantageous over other embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal (AT), user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as Code Division Multiple Access (CDMA), Multiple-Carrier CDMA (MC-CDMA), Wideband CDMA (W-CDMA), High-Speed Packet Access (HSPA, HSPA+), Time Division Multiple Access (TDMA), Frequency Division Multiple Access (FDMA), Orthogonal Frequency Division Multiple Access (OFDMA), Single Carrier Frequency Domain Multiplexing (SC-FDMA) and other multiple access systems/techniques. The terms "system" and "network" may be used interchangeably. A CDMA system may implement a radio technology such as Universal Terrestrial Radio Access (UTRA), CDMA2000, etc. UTRA may includes W-CDMA and/or other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). It is further noted that the wireless communication system described herein may implement one or more standards, such as, for example, IS-95, cdma2000, IS-856, W-CDMA, TD-SCDMA, etc.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for interference management in a spectrum shared by a WAN macro cell and a femto cell, comprising:
   detecting a WAN access terminal (AT) in a coverage area of the femto cell;
   accessing a control message sent by a WAN access point (AP) to the WAN AT;
   determining a first resource of the spectrum that the WAN AT will use to communicate with the WAN AP based at least in part on the control message; and
   assigning a second resource of the spectrum to a femto AT in the coverage area based at least in part on the determined first resource.

2. The method of claim wherein accessing comprises intercepting the control message.

3. The method of claim 2, further comprising receiving information from the WAN AT that facilitates intercepting the control message.

4. The method of claim 3, wherein receiving comprises receiving at least one of a Cell Radio Network Temporary Identifier (C-RNTI) and a Media Access Control Identifier (MAC ID).

5. The method of claim 4, wherein the at least one of the C-RNTI and the MAC ID is sent from the WAN AP.

6. The method of claim 1, wherein the control message comprises a broadcast message from the WAN AP.

7. The method of claim 1, wherein the control message comprises at least one of an ACK message and a NACK message.

8. The method of claim 1, wherein determining comprises determining the first resource based on data relating to at least one of a forward link bandwidth configuration and a downlink bandwidth configuration.

9. The method of claim 1, wherein determining comprises determining the first resource based on data relating to at least one of a reverse link bandwidth configuration and an uplink bandwidth configuration.

10. The method of claim 1, wherein determining comprises determining the first resource based at least in part on at least one of sector ID data and system time data of the WAN AP.

11. The method of claim 1, wherein assigning comprises selecting the second resource based at least in part on a bandwidth portion that the WAN AT is expected to use to communicate with the WAN AP during a subsequent occurrence of an interlace.

12. The method of claim 1, wherein assigning comprises selecting an unjammed resource for the femto AT in response to at least one of the WAN AT and the WAN AP jamming at least one resource of the spectrum.

13. The method of claim 12, wherein selecting comprises calculating a bandwidth portion that will be assigned to the WAN AT during a subsequent occurrence of an interlace, the unjammed resource comprising an available bandwidth portion other than the calculated bandwidth portion.

14. The method of claim 1, wherein determining comprises inferring the first resource that is expected to be assigned to the WAN AT during a subsequent occurrence of an interlace based at least in part on the control message.

15. The method of claim 14, further comprising calculating whether co-assigning the first resource to the femto AT will increase a data transfer rate between the femto AT and a femto AP.

16. The method of claim 15, wherein the second resource comprises the first resource when it is calculated that co-assigning the first resource to the femto AT will increase the data transfer rate.

17. The method of claim 14, further comprising treating as erasure any data transferred on the first resource during the subsequent occurrence of the interlace, in response to determining that the data is unreliable.

18. The method of claim 17, wherein determining that the data is unreliable comprises determining that a signal energy level of the first resource exceeds a defined upper limit.

19. A communication device for interference management in a spectrum shared by a WAN macro cell and a femto cell, comprising:
   a transceiver supporting a communication link with at least one femto access terminal (AT) in a coverage area of the femto cell;
   at least one processor in operative communication with the transceiver;
   a memory in operative communication with the at least one processor and comprising executable code for the at least one processor to:
   detect a WAN AT in the coverage area;
   access a control message sent by a WAN access point (AP) to the WAN AT;
   determine a first resource of the spectrum that the WAN AT will use to communicate with the WAN AP based at least in part on the control message; and
   assign a second resource of the spectrum to the at least one femto AT based at least in part on the determined first resource.

20. The device of claim 19, wherein the at least one processor is adapted to access by intercepting the control message.

21. The device of claim 20 wherein the at least one processor is adapted to receive information from the WAN AT that facilitates intercepting the control message.

22. The device of claim 21, wherein the received information comprises at least one of a Cell Radio Network Temporary Identifier (C-RNTI) and a Media Access Control Identifier (MAC ID).

23. The device of claim 22, wherein the at least one of the C-RNTI and the MAC ID is sent from the WAN AP.

24. The device of claim 19, wherein the control message comprises a broadcast message from the WAN AP.

25. The device of claim 19, wherein the control message comprises at least one of an ACK message and a NACK message.

26. The device of claim 19, wherein the at least one processor is adapted to determine the first resource based on data relating to at least one of a forward link bandwidth configuration and a downlink bandwidth configuration.

27. The device of claim 19, wherein the at least one processor is adapted to determine the first resource based on data relating to at least one of a reverse link bandwidth configuration and an uplink bandwidth configuration.

28. The device of claim 19, wherein the at least one processor is adapted to determine the first resource based at least in part on at least one of sector ID data and system time data of the WAN AP.

29. The device of claim 19, wherein the at least one processor is adapted to assign by selecting the second resource based at least in part on a bandwidth portion that the WAN AT is expected to use to communicate with the WAN AP during a subsequent occurrence of an interlace.

30. The device of claim 19, wherein the at least one processor is adapted to assign by selecting an unjammed resource for the femto AT in response to at least one of the WAN AT and the WAN AP jamming at least one resource of the spectrum.

31. The device of claim 30, wherein the at least one processor is adapted to select by calculating a bandwidth portion that will be assigned to the WAN AT during a subsequent occurrence of an interlace, the unjammed resource comprising an available bandwidth portion other than the calculated bandwidth portion.

32. The device of claim 19, wherein the at least one processor is adapted to determine by inferring the first resource that is expected to be assigned to the WAN AT during a subsequent occurrence of an interlace based at least in part on the control message.

33. The device of claim 32, wherein the at least one processor is adapted to calculate whether co-assigning the first resource to the femto AT will increase a data transfer rate between the femto AT and a femto AP.

34. The device of claim 33, wherein the second resource comprises the first resource when it is calculated that co-assigning the first resource to the femto AT will increase the data transfer rate.

35. The device of claim 32, wherein the at least one processor is adapted to treat as erasure any data transferred on the first resource during the subsequent occurrence of the interlace, in response to determining that the data is unreliable.

36. The device of claim 35, wherein determining that the data is unreliable comprises determining that a signal energy level of the first resource exceeds a defined upper limit.

37. An apparatus for interference management in a spectrum shared by a WAN macro cell and a femto cell, comprising:
means for detecting a WAN access terminal (AT) in a coverage area of the femto cell;
means for accessing a control message sent by a WAN access point (AP) to the WAN AT;
means for determining a first resource of the spectrum that the WAN AT will use to communicate with the WAN AP based at least in part on the control message; and
means for assigning a second resource of the spectrum to a femto AT in the coverage area based at least in part on the determined first resource.

38. The apparatus of claim 37, wherein the means for accessing comprises means for intercepting the control message.

39. The apparatus of claim 38 wherein the means for accessing comprises means for receiving information from the WAN AT that facilitates intercepting the control message.

40. The apparatus of claim 39, wherein the received information comprises at least one of a Cell Radio Network Temporary Identifier (C-RNTI) and a Media Access Control Identifier (MAC ID).

41. The apparatus of claim 40, wherein the at least one of the C-RNTI and the MAC ID is sent from the WAN AP.

42. The apparatus of claim 37, wherein the control message comprises a broadcast message from the WAN AP.

43. The apparatus of claim 37, wherein the control message comprises at least one of an ACK message and a NACK message.

44. The apparatus of claim 37, wherein the means for determining comprises means for inferring the first resource based on data relating to at least one of a forward link bandwidth configuration and a downlink bandwidth configuration.

45. The apparatus of claim 37, wherein the means for determining comprises means for inferring the first resource based on data relating to at least one of a reverse link bandwidth configuration and an uplink bandwidth configuration.

46. The apparatus of claim 37, wherein the means for determining comprises means for inferring the first resource based at least in part on at least one of sector ID data and system time data of the WAN AP.

47. The apparatus of claim 37, wherein the means for determining comprises means for inferring a first bandwidth portion that the WAN AT will use to receive data from the WAN AP.

48. The apparatus of claim 37, wherein the means for determining comprises means for inferring a first bandwidth portion that the WAN AT will use to transmit data to the WAN AP.

49. The apparatus of claim 37, wherein the means for assigning comprises means for selecting a bandwidth portion that the WAN AT is expected to use to communicate with the WAN AP during a subsequent occurrence of an interlace.

50. The apparatus of claim 37, wherein the means for assigning comprises means for selecting an unjammed resource for the femto AT in response to at least one of the WAN AT and the WAN AP jamming at least one resource of the spectrum.

51. The apparatus of claim 37, wherein the means for selecting comprises means for calculating a bandwidth portion that will be assigned to the WAN AT during a subsequent occurrence of an interlace, the unjammed resource comprising an available bandwidth portion other than the calculated bandwidth portion.

52. The apparatus of claim 37, wherein the means for determining comprises means for inferring the first resource that is expected to be assigned to the WAN AT during a subsequent occurrence of an interlace based at least in part on the control message.

53. The apparatus of claim 52, wherein the means for determining comprises means for calculating whether co-assigning the first resource to the femto AT will increase a data transfer rate between the femto AT and a femto AP.

54. The apparatus of claim 53, wherein the second resource comprises the first resource when it is calculated that co-assigning the first resource to the femto AT will increase the data transfer rate.

55. The apparatus of claim 52, further comprising means for treating as erasure any data transferred on the first resource during the subsequent occurrence of the interlace, in response to determining that the data is unreliable.

56. The apparatus of claim 55, wherein determining that the data is unreliable comprises determining that a signal energy level of the first resource exceeds a defined upper limit.

57. A computer program product, comprising:
a non-transitory computer-readable median comprising:
  code for causing a computer to detect a WAN access terminal (AT) in a coverage area of a femto cell that shares a spectrum with a WAN macro cell;
  code for causing a computer to access a control message sent by a WAN access point (AP) to the WAN AT;
  code for causing a computer to determine a first resource of the spectrum that the WAN AT will use to communicate with the WAN AP based at least in part on the control message; and
  code for causing a computer to assign a second resource of the spectrum to a femto AT in the coverage area based at least in part on the determined first resource.

58. The computer program product of claim 57, wherein the non-transitory computer-readable medium further comprises code for causing a computer to intercept the control message.

* * * * *